United States Patent
Bernico

(10) Patent No.: US 11,610,441 B1
(45) Date of Patent: Mar. 21, 2023

(54) DETECTING AND MITIGATING LOCAL INDIVIDUAL DRIVER ANOMALOUS BEHAVIOR

(71) Applicant: STATE FARM MUTUAL AUTOMOBILE INSURANCE COMPANY, Bloomington, IL (US)

(72) Inventor: Michael Bernico, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 293 days.

(21) Appl. No.: 15/629,850

(22) Filed: Jun. 22, 2017

Related U.S. Application Data

(60) Provisional application No. 62/510,112, filed on May 23, 2017.

(51) Int. Cl.
| | | |
|---|---|---|
| *G07C 5/08* | (2006.01) | |
| *G06Q 40/08* | (2012.01) | |
| *G06N 20/00* | (2019.01) | |

(52) U.S. Cl.
CPC ........... *G07C 5/0841* (2013.01); *G06N 20/00* (2019.01); *G06Q 40/08* (2013.01); *G07C 5/0816* (2013.01)

(58) Field of Classification Search
CPC .... G07C 5/0841; G07C 5/0816; G06N 20/00; G06Q 40/08
See application file for complete search history.

(56) References Cited

U.S. PATENT DOCUMENTS

| | | | |
|---|---|---|---|
| 8,903,593 B1 * | 12/2014 | Addepalli | ............. H04W 4/046 701/29.1 |
| 9,311,271 B2 | 4/2016 | Wright | |
| 9,633,487 B2 | 4/2017 | Wright | |

(Continued)

FOREIGN PATENT DOCUMENTS

WO   WO-2015175435 A1 *  11/2015   ........... A61B 5/6893

OTHER PUBLICATIONS

Wikipedia. "Anomaly detection". http://en/wikipedia.org/wiki/Anomaly_detection#cite_note-12. Obtained on Jul. 17, 2019. (Year: 2019).*

(Continued)

*Primary Examiner* — Jeffrey C Boomer
(74) *Attorney, Agent, or Firm* — Marshall, Gerstein & Borun LLP

(57) ABSTRACT

Systems and methods for identifying anomalous driving behavior for a vehicle based on past driving behavior are disclosed herein. The method may include receiving a set of time-series driving data for the vehicle, wherein the set of time-series driving data is indicative of a set of operating conditions for the vehicle. Performing machine learning operations on the set of time-series driving data. Identifying a set of anomalous conditions in the time-series driving data based on a result set produced by the machine learning operations, wherein the set of anomalous conditions are indicative of an anomalous vehicle behavior. Comparing the set of anomalous conditions to a set of historical time-series driving data for the vehicle. Generating a vehicle feedback based on the time-series driving data and the comparison of the set of anomalous conditions to the set of historical time-series driving data.

9 Claims, 14 Drawing Sheets

(56) References Cited

U.S. PATENT DOCUMENTS

| | | | | |
|---|---|---|---|---|
| 9,776,644 B2* | 10/2017 | Chun | ................... | A61B 5/7267 |
| 9,878,663 B1* | 1/2018 | Kochura | ............... | B60W 40/08 |
| 10,192,369 B2 | 1/2019 | Wright | | |
| 10,198,879 B2 | 2/2019 | Wright | | |
| 10,417,837 B2* | 9/2019 | Stanek | ................. | G07C 5/0808 |
| 2002/0121981 A1* | 9/2002 | Munch | ................... | G08B 21/06 |
| | | | | 340/576 |
| 2005/0131597 A1* | 6/2005 | Raz | ...................... | G09B 19/167 |
| | | | | 701/29.1 |
| 2011/0258044 A1* | 10/2011 | Kargupta | ............... | G06Q 10/08 |
| | | | | 705/14.49 |
| 2014/0095016 A1* | 4/2014 | Suganuma | ............... | G07C 5/00 |
| | | | | 701/32.1 |
| 2015/0254330 A1* | 9/2015 | Chan | ..................... | G06F 16/219 |
| | | | | 707/613 |
| 2017/0217276 A1* | 8/2017 | Banvait | ............. | B60G 17/0162 |
| 2018/0324199 A1* | 11/2018 | Crotinger | ............ | H04L 63/1425 |
| 2019/0173902 A1* | 6/2019 | Takahashi | ............ | G06K 9/6298 |

OTHER PUBLICATIONS

US Department of Transportation (DoT), Vehicle Based Data and Availability, Oct. 2012 (Archived on archive.org on Jul. 14, 2015, accessed Jun. 18, 2020). (Year: 2012).*

Dr. Giri, Nupur, "Pothole Detection system using Machine Learning on Android", International Journal of Emerging Technology and Advanced Engineering, vol. 4, Issue 7, Jul. 2014 (Year: 2014).*

* cited by examiner

508

Train an isolation forest on the frequency data on a per driver basis

514

524

Only 4 lines are needed to isolate this data point (highly anomalous)

Using Redis as a Distributed Message Bus

600

- Redis – In Memory key, value store – Super fast, can be used as a database, cache, or message broker.

- Message Broker Architecture lets us consume messages as the VSD/ASD generates them and buffer them for anomaly detection

DETECTING AND MITIGATING LOCAL INDIVIDUAL DRIVER ANOMALOUS BEHAVIOR

CROSS REFERENCE TO RELATED APPLICATIONS

This application claims priority to Provisional Application No. 62/510,112, entitled "Detecting and Mitigating Local Individual Driver Anomalous Behavior," filed May 23, 2017, which is incorporated herein by reference in its entirety.

TECHNICAL FIELD

The present disclosure generally relates to systems and methods for identifying anomalous driving behavior for a vehicle based on past driving behavior and, in particular, using machine learning operations to identify and generate feedback and messages for a driver of the vehicle based on the anomalous driving behavior.

BACKGROUND

Drivers generally drive the same routes on a regular basis. They may drive back and forth between their homes and work. Additionally, most drivers drive in a particular manner every time that they are driving. These behaviors may be known to a driver and are useful heuristics to allow the driver to focus on driving and other tasks; however, it may be difficult for drivers, or other drivers sharing the road, to know when a driver is driving erratically. Similarly, it is also difficult for other drivers to know when a driver near them is having a medical emergency, or undergoing some other anomalous situation that may be a dangerous situation for drivers on the road. Detecting and mitigating this anomalous behavior has many challenges.

SUMMARY

The present disclosure generally relates to systems and methods identifying anomalous driving behavior for a vehicle based on past driving behavior. Embodiments of example systems and methods are summarized below. The methods and systems summarized below may include additional, less, or alternate actions, including those discussed elsewhere herein.

In one embodiment, a computer-implemented method for identifying in anomalous driving behavior for a vehicle based on past driving behavior is disclosed. The method includes receiving a set of time-series driving data for the vehicle, wherein the set of time-series driving data is indicative of a set of operating conditions for the vehicle; performing machine learning operations on the set of time-series driving data; identifying a set of anomalous conditions in the time-series driving data based on a result set produced by the machine learning operations, wherein the set of anomalous conditions are indicative of an anomalous vehicle behavior; comparing the set of anomalous conditions to a set of historical time-series driving data for the vehicle; and generating a vehicle feedback based on the time-series driving data and the comparison of the set of anomalous conditions to the set of historical time-series driving data.

In another embodiment, a computer implemented method for identifying anomalous driving behavior for a vehicle based on machine learning operations is disclosed. The method includes receiving a set of time-series driving data, wherein the set of time-series driving data is indicative of a set of operating conditions for the vehicle; performing machine learning operations on the set the set of time-series driving data; identifying a set of anomalous conditions in the time-series driving data based on a result set produced by the machine learning operations, wherein the set of anomalous conditions are indicative of an anomalous vehicle behavior; and modifying the machine learning operations based on the set of time-series driving data and the identified set of anomalous conditions.

In yet another embodiment, a system for identifying anomalous driving behavior for a vehicle based on machine learning operations is disclosed. The system includes a network interface configured to interface with a processor; a plurality of sensors affixed to the vehicle and configured to interface with the processor; a memory configured to store non-transitory computer executable instructions and configured to interface with the processor. The processor may be configured to interface with the memory, wherein the processor is configured to execute the non-transitory computer executable instructions to cause the processor to: receive a set of time-series driving data, wherein the set of time-series driving data is indicative of a set of operating conditions for the vehicle; perform machine learning operations on the set the set of time-series driving data; identify a set of anomalous conditions in the time-series driving data based on a result set produced by the machine learning operations, wherein the set of anomalous conditions are indicative of an anomalous vehicle behavior; and generate a command based on the set of time-series driving data and the identified set of anomalous conditions.

BRIEF DESCRIPTION OF DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 5E depicts a plot of frequency data converted from time series data that may be indicative of anomalous driving behavior;

DETAILED DESCRIPTION

Figure 1A:
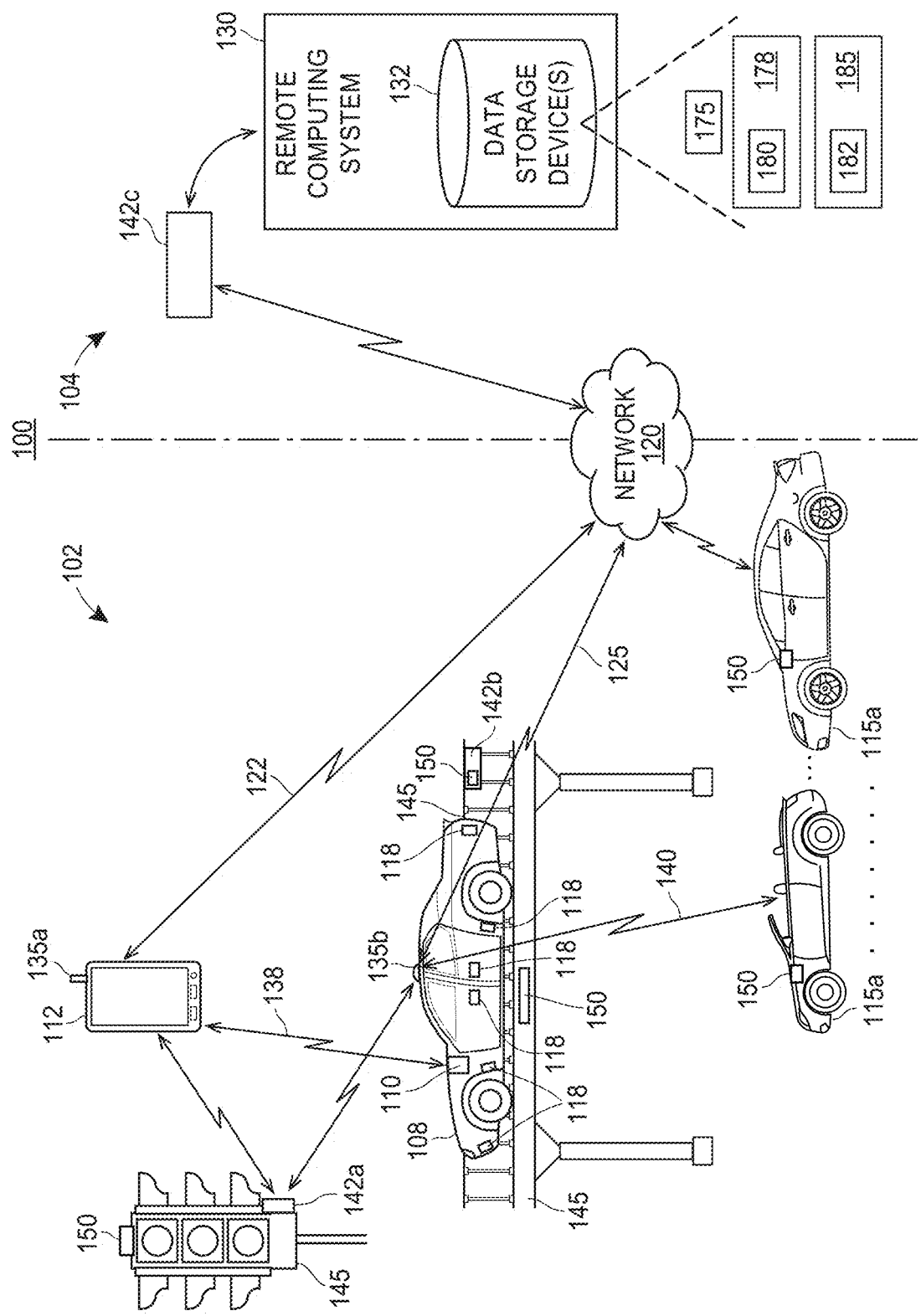
FIG. 1A illustrates a block diagram of an exemplary system identifying anomalous driving behavior for a vehicle based on past driving behavior.

The present disclosure generally relates to systems and methods for identifying anomalous driving behavior for a vehicle based on past driving behavior and, in particular, using machine learning operations to identify and generate feedback for a driver of the vehicle based on the anomalous driving behavior. The systems and methods may use an individual driver's past driving behaviors to detect his or her anomalous behavior. This detection may be done in near "real-time" or may be post-processing detection. The near real-time detection may include monitoring messages (e.g., MTC data) and comparing this data to a driver's past data. The presence of an anomaly may mean that there has been a significant change in the driver behavior, for example, the driver is driving drunk or the driver is having a cardiac arrest. When detected, feedback may be provided to a driver operating a vehicle, feedback to a vehicle to change an operation of the vehicle being driven, and/or feedback to (e.g., alert) surrounding connected cars (which may be autonomous vehicles or driven by a human). The feedback may change driving behavior of autonomous vehicles, and the feedback may have a geographical and/or temporal component.

Anomalous driving behaviors may be any type of driving behaviors that are deviations from normal driving behaviors. Some anomalous driving behaviors may be based on the operation of the vehicle. For example, speeding, braking irregularly, cornering too fast while turning, swerving in and out of traffic, crossing lanes along a roadway, or the like. In other cases the anomalous driving behaviors may be indicative of an emergency situation occurring with a driver of a vehicle. For example, data indicative of a medical situation (e.g. heart attacks, diabetic episodes, seizures, strokes, severe sneezing, cramps, reaction to medicines, mental delusions, or syncope), a distracted driver, or previously unidentified road conditions that may be dangerous for the driver. Similarly, the anomalous deriving behavior may be based on impaired or intoxicated drivers that may be detected regardless of blood alcohol level or even substance type that the driver may have taken. Additionally, the anomalous driving behavior may be based on the route that a driver has taken. For example, a driver may have taken a different route from the normal route that the driver drives. Alternatively, there may be situations where the non-primary driver listed on insurance for the vehicle is the driver, which may impact the data collected or how that data is interpreted.

The systems and methods may make use of machine learning operations to detect and learn anomalous driving behaviors from a dataset of driving data. The systems and methods may utilize a variety of different machine learning approaches. For example, a classification model, a decision tree approach, an artificial neural network, cluster analysis, deep learning, supervised/unsupervised learning, predictive statistical analysis, and the like.

Feedback may be provided to a driver, vehicle, other vehicles, and other drivers through a variety of approaches. For feedback provided to a driver, the feedback may be provided through any communication system that is contained within the vehicle. For example, audio or video messages delivered to the vehicle. Alternatively, feedback may be provided to a mobile device in use by the driver. Similarly, in a situation where a driver is non-responsive, perhaps due to a medical situation, the feedback may take the form of commands to take over operation of the vehicle. In this same vein, a communication (e.g. alert) may be made to other vehicles on the road near the vehicle that is undergoing an anomalous driving behavior. This communication may be made to the other vehicles directly, or may be made to mobile devices in use by the drivers of the other vehicles.

The anomalous driving behaviors may be detected through a variety of means, such as in near "real-time," and in other cases the behaviors may be detected as part of post-processing done on a dataset collected over time. The dataset collected over time may be a time series dataset. This data may be indicative of the operating conditions of the vehicle and as such a behavior of the vehicle may be determined. If detected in near real-time, the data may be any data that is updated continuously and immediately after the data is collected. Real-time data is typically delivered near instantaneously after it is collected. There is a minimal amount of lag time between when real-time data is collected and real-time data is delivered. This means that, for example, the data may be collected and delivered in intervals by the microsecond, millisecond, centisecond, decisecond, second, minute, and so forth. Conversely, the post-processing detection may make use of static data that may be defined as any data that is not real-time data. Static data may be collected in real-time; however, static data is not delivered in real-time. Rather static data may be delivered according to a schedule, such as hourly, daily, weekly, monthly, yearly, etc.

In some embodiments of the systems and methods, the time-series data may be MTC data. MTC data may be data consisting of monitoring messages of the overall operation of the vehicle as it is under use. These monitoring messages may be transmitted frequently to update a recipient of the status of the vehicle. For example, the messages may be transmitted ten times every second. This data when collected over a period of time and analyzed allows for a sense of how a vehicle, and by extension the vehicle's driver, are operating. By analyzing large amounts of this data a baseline of what is or is not normal driving behavior may be established. With a normal driving behavior established deviations from that behavior may be detected.

In some embodiments, the time-series data, or more particularly MTC data, may be basic safety message data for the vehicle, such as basic safety message (BSM) data that is a part of the SAE J2735 Dedicated Short Range Communications standard promulgated by the Society of Automotive Engineers International. This BSM data may be transmitted ten times every second over the air to other vehicles, or to a vehicle service provider, to communicate the status of the vehicle. This BSM data may include the following for the vehicle: latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. In some cases, these BSM may be communicated over a distance of 1000 meters, in other cases a shorter or longer distance may be used depending on the communication technology. Additionally, the BSM may also communicate the following: recent braking, path prediction, throttle position, trailer weight, vehicle type, vehicle description, anti-lock brake system status, traction status, stability control, differential GPS, lights status, wiper status, brake level, coefficient of friction, rain type, air temperature, air pressure, vehicle identification, cargo weight, and GPS status. All of these different data types communicated on a regular basis allow for an accurate picture of what is currently happening to a vehicle.

In some embodiments, the vehicle may be equipped with a vehicle awareness device (VAD), or aftermarket safety device (ASD), that transmits the BSMs. The VAD, or ASD, may also trade vehicle to vehicle (V2V) messages with other vehicles so that vehicles can notify each other about events of concern that may be determined by analyzing the BSM data. Using the MTC data, or BSM data an anomaly detection engine that can send proactive notifications to a driver of a vehicle, or other vehicles on the road when the anomaly detection engine.

FIG. 1A illustrates a block diagram of an exemplary system 100 for identifying anomalous driving behavior for a vehicle based on past driving behavior. The high-level architecture illustrated in FIG. 1A may include both hardware and software applications, as well as various data communications channels for communicating data between the various hardware and software components, as is described below. The system 100 may be roughly divided into front-end components 102 and back-end components 104. The front-end components 102 may obtain information regarding a vehicle 108 (e.g., a car, truck, motorcycle, etc.) that is being operated by a driver, or being operated autonomously, and regarding the context and surrounding environment in which the vehicle 108 is being operated. One or more on-board computers 110 and/or one or more mobile devices 112 that are included in the front-end components 102 and disposed at the vehicle 108 may utilize this information to, for example, notify or alert the driver of the vehicle 108, notify or alert other drivers and other vehicles 115a-115n that are operating in the surrounding environment, automatically change an operating behavior of the vehicle 108 and/or of any one or more of the other vehicles 115a-115n, and/or to assist the driver in operating the vehicle 108. The one or more on-board computers 110 may be permanently or removably installed in the vehicle 108, and the one or more mobile devices 112 may be disposed at and transported by the vehicle 108, for example.

Generally speaking, the on-board computer 110 may be an on-board computing device capable of performing various functions relating to vehicle operations and identifying anomalous driving behavior for a vehicle based on past driving behavior. That is, the on-board computer 110 may be particularly configured with particular elements to thereby be able to perform functions relating to identifying anomalous driving behavior for a vehicle based on past driving behavior. In some embodiments, the on-board computer 110 may include an anomaly detection engine. Further, the on-board computer 110 may be installed by the manufacturer of the vehicle 108, or as an aftermarket modification or addition to the vehicle 108. In FIG. 1A, although only one on-board computer 110 is depicted, it should be understood that in some embodiments, a plurality of on-board computers 110 (which may be installed at one or more locations within the vehicle 108) may be used. However, for ease of reading and not for limitation purposes, the on-board computing device or computer 110 is referred to herein using the singular tense.

The mobile device 112 may be transported by the vehicle 108 and may be, for example, a personal computer or personal electronic device (PED), cellular phone, smart phone, tablet computer, smart watch, wearable electronics, or a dedicated vehicle monitoring or control device which may be releasably attached to the vehicle 108. In some embodiments, the anomaly detection engine mentioned above may be a part of the mobile device 112. Although only one mobile device 112 is illustrated in FIG. 1A, it should be understood that in some embodiments, a plurality of mobile devices 112 may be included in the system 100. For ease of reading and not for limitation purposes, though, the mobile device 112 is referred to herein using the singular tense.

Further, it is noted that, in some embodiments, the on-board computer 110 may operate in conjunction with the mobile device 112 to perform any or all of the functions described herein as being performed on-board the vehicle 108. In other embodiments, the on-board computer 110 may perform all of the on-board vehicle functions described herein, in which case either no mobile device 112 is being transported by the vehicle 108, or any mobile device 112 that is being transported by the vehicle 108 is not operatively connected to the vehicle or its sensors. In still other embodiments, the mobile device 112 may perform all of the onboard vehicle functions described herein. Still further, in some embodiments, the on-board computer 110 and/or the mobile device 112 may perform any or all of the functions described herein in conjunction with one or more back-end components 104. For example, in some embodiments and under certain conditions, the mobile device 112 and/or on-board computer 110 may function as thin-client devices that outsource some or most of the processing to one or more of the back-end components 104.

At any rate, the on-board computing device 110 and/or the mobile device 112 disposed at the vehicle 108 may communicatively interface with one or more on-board sensors 118 that are disposed on or within the vehicle 108 and that may be utilized to monitor the vehicle 108 and the environment in which the vehicle 108 is operating. That is, the one or more on-board sensors 118 may sense conditions associated with the vehicle 108 and/or associated with the environment in which the vehicle 108 is operating, and may collect data indicative of the sensed conditions. In some configurations, at least some of the on-board sensors 118 may be fixedly disposed at various locations on the vehicle 108. Additionally or alternatively, at least some of the on-board sensors 118 may be incorporated within or connected to the on-board computer 110. Still additionally or alternatively, in some configurations, at least some of the on-board sensors 118 may be included on or within the mobile device 112. Whether disposed at or on the vehicle 108 or disposed at or on a mobile device 112 being transported by the vehicle 108, though, the one or more of the sensors 118 are generally referred to herein as "on-board sensors 118," and the data collected by the on-board sensors 118 is generally referred to herein as "sensor data," "on-board sensor data," or "vehicle sensor data." The on-board sensors 118 may communicate respective sensor data to the on-board computer 110 and/or to the mobile device 112, and the sensor data may be processed using the on-board computer 110 and/or the mobile device 112 to determine when the vehicle is in operation as well as determine information regarding the vehicle 108, the vehicle's operating behavior, and/or the driver's operating behavior and performance. In some situations, the on-board sensors 118 may communicate respective sensor data indicative of the environment in which the vehicle 108 is operating.

As discussed above, at least some of the on-board sensors 118 associated with the vehicle 108 may be removably or fixedly disposed within or at the vehicle 108 and further may be disposed in various arrangements and at various locations to sense and provide information. The sensors 118 that are installed at the vehicle 108 may include one or more of a GPS unit, a radar unit, a LIDAR unit, an ultrasonic sensor, an infrared sensor, some other type of electromagnetic energy sensor, an inductance sensor, a camera, an accelerometer, an odometer, a system clock, a gyroscope, a compass, a geo-location or geo-positioning unit, a location tracking sensor, a proximity sensor, a tachometer, and/or a speedometer, to name a few. Some of the on-board sensors 118 (e.g., GPS, accelerometer, or tachometer units) may provide sensor data indicative of, for example, the vehicle's location, speed, position acceleration, direction, responsiveness to controls, movement, etc. Other sensors 118 that are disposed at the vehicle 108 may be directed to the interior or passenger compartment of the vehicle 108, such as cameras, microphones, pressure sensors, weight sensors, thermometers, or similar sensors to monitor the vehicle operator, any passengers, operations of instruments included in the vehicle, operational behaviors of the vehicle, and/or conditions within the vehicle 108. For example, on-board sensors 118 directed to the interior of the vehicle 108 may provide sensor data indicative of, for example, in-cabin temperatures, in-cabin noise levels, data from seat sensors (e.g., indicative of whether or not a person is using a seat, and thus the number of passengers being transported by the vehicle 108), data from seat belt sensors, data regarding the operations of user controlled devices such as windshield wipers, defrosters, traction control, mirror adjustment, interactions with on-board user interfaces, etc. Some of the sensors 118 disposed at the vehicle 108 (e.g., radar, LIDAR, camera, or other types of units that operate by using electromagnetic energy) may actively or passively scan the environment external to the vehicle 108 for obstacles (e.g., other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the vehicle's environment. Information or data that is generated or received by the on-board sensors 118 may be communicated to the on-board computer 110 and/or to the mobile device 112, for example.

In some embodiments of the system 100, the front-end components 102 may communicate collected sensor data to the back-end components 104, e.g., via a network 120. For example, at least one of the on-board computer 110 or the mobile device 112 may communicate with the back-end components 104 via the network 120 to allow the back-end components 104 to record collected sensor data and information regarding vehicle usage. The network 120 may include a proprietary network, a secure public internet, a virtual private network, and/or some other type of network, such as dedicated access lines, plain ordinary telephone lines, satellite links, cellular data networks, combinations of these and/or other types of networks. The network 120 may utilize one or more radio frequency communication links to communicatively connect to the vehicle 108, e.g., utilize wireless communication links 122 and 125 to communicatively connect with mobile device 112 and on-board computer 110, respectively. Where the network 120 comprises the Internet or other data packet network, data communications may take place over the network 120 via an Internet or other suitable data packet communication protocol. In some arrangements, the network 120 additionally or alternatively includes one or more wired communication links or networks.

Figure 1B:
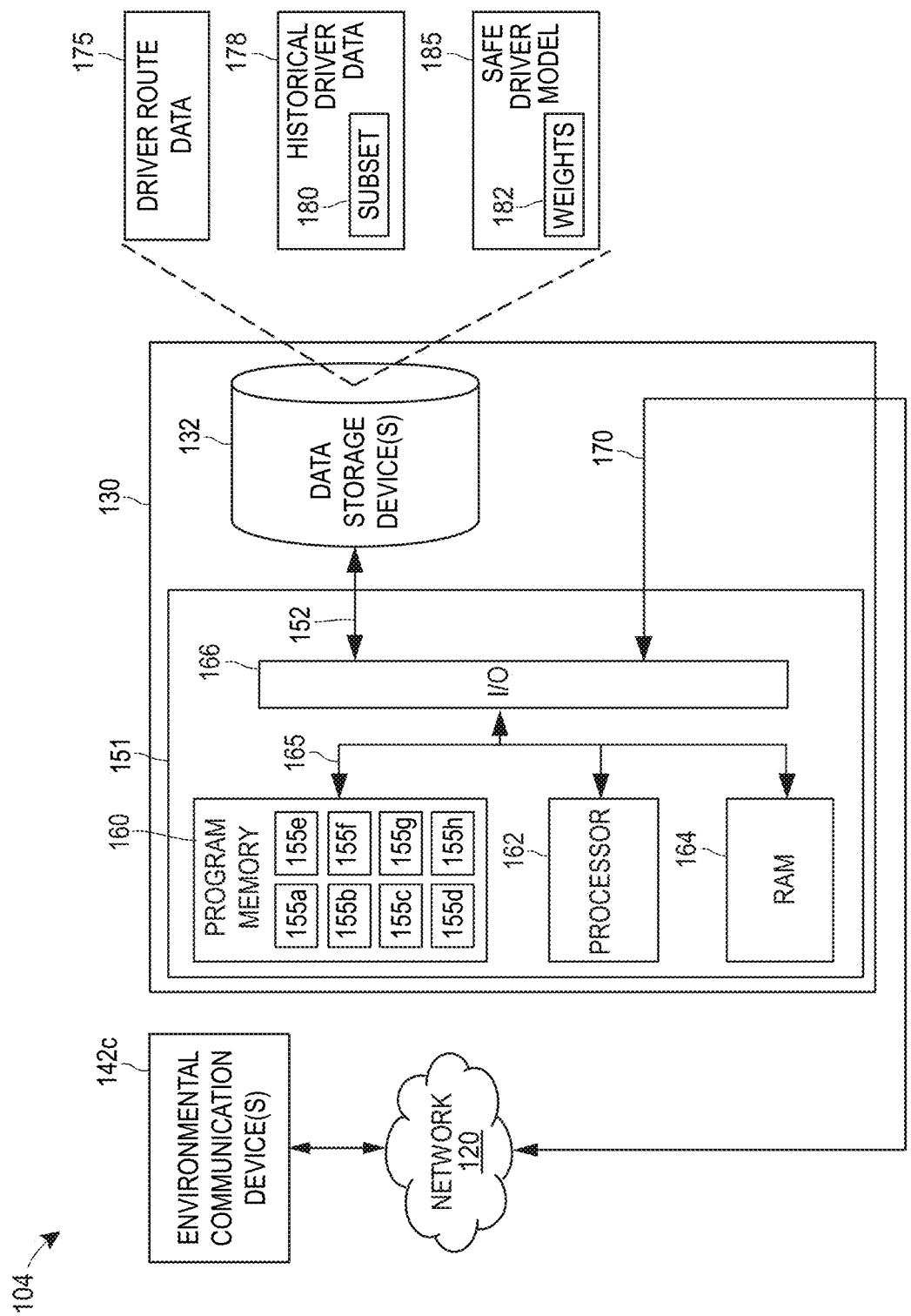
FIG. 1B illustrates a more detailed block diagram of the back-end components of the exemplary system shown in FIG. 1A.

The back-end components 104 include one or more servers or computing devices, which may be implemented as a server bank or cloud computing system 130, and is interchangeably referred to herein as a "remote computing system 130." The remote computing system 130 may include one or more computer processors adapted and configured to execute various software applications and components of the system 100, in addition to other software applications. In some embodiments, the anomaly detection engine mentioned above may be part of the remote computing system 130. The remote computing system 130 may further include or be communicatively connected to one or more data storage devices or entities 132, which may be adapted to store data related to the operation of the vehicle 108, driver performance, the environment and context in which the vehicle 108 is operating, and/or other information. For example, the one or more data storage devices 132 may be implemented as a data bank or a cloud data storage system, at least a portion of which may be included in and/or locally accessed by the remote computing system 130 (for example, as illustrated in FIG. 1A) using a local access mechanism such as a function call or database access mechanism, and/or at least a portion of which may be remotely accessed by the remote computing system 130 (for example, as illustrated in FIG. 1B) using a remote access mechanism such as a communication protocol. Thus, although only one data storage device 132 is illustrated in FIGS. 1A and 1B, it is understood that in some embodiments, a plurality of data storage devices or entities 132 may be included in the system 100. For ease of reading and not for limitation purposes, though, the data storage device 132 is referred to herein using the singular tense. The remote computing system 130 may access data stored in the data storage device 132 when executing various functions and tasks associated with the present disclosure.

To communicate with the remote computing system 130 and other portions of the back-end components 104, the front-end components 102 may include one or more communication components 135a, 135b that are configured to transmit information to and receive information from the back-end components 104 and, in some embodiments, transmit information to and receive information from other external sources, such as other vehicles and/or infrastructure or environmental components disposed within the vehicle's environment. The one or more communication components 135*a*, 135*b* may include one or more wireless transmitters or transceivers operating at any desired or suitable frequency or frequencies. Different wireless transmitters or transceivers may operate at different frequencies and/or by using different protocols, if desired. In an example, the mobile device 112 may include a respective communication component 135*a* for sending or receiving information to and from the remote computing system 130 via the network 120, such as over one or more radio frequency links or wireless communication channels 122 which support a first communication protocol (e.g., GSM, CDMA, LTE, one or more IEEE 802.11 Standards such as Wi-Fi, WiMAX, BLUETOOTH, etc.). Additionally or alternatively, the on-board computer 110 may operate in conjunction with an on-board transceiver or transmitter 135*b* that is disposed at the vehicle 108 (which may, for example, be fixedly attached to the vehicle 108) for sending or receiving information to and from the remote computing system 130 via the network 120, such as over one or more radio frequency links or wireless communication channels 125 which support the first communication protocol and/or a second communication protocol. In some embodiments, the on-board computer 110 may operate in conjunction with the mobile device 112 to utilize the communication component 135*a* of the mobile device 112 and the link 122 to deliver information to the back-end components 104. In some embodiments, the on-board computer 110 may operate in conjunction with the mobile device 112 to utilize the communication component 135*b* of the vehicle 108 and the link 125 to deliver information to the back-end components 104. In some embodiments, both communication components 135*a*, 135*b* and their respective links 122, 125 may be utilized by the on-board computer 110 and/or the mobile device 112 to communicate with the back-end components 104.

Accordingly, either one or both of the mobile device 112 or on-board computer 110 may communicate with the network 120 over the links 122 and/or 125. Additionally, in some configurations, the mobile device 112 and on-board computer 110 may communicate with one another directly over a link 138, which may be a wireless or wired link.

In some embodiments of the system 100, the on-board computer 110 and/or the on-board mobile device 112 of the vehicle 108 may communicate with respective on-board computers and/or mobile devices disposed at one or more other vehicles 115*a*-115*n*, either directly or via the network 120. For example, the on-board computer 110 and/or the mobile device 112 disposed at the vehicle 108 may communicate with other vehicles' respective on-board computers and/or mobile devices via the network 120 and one or more of the communication components 135*a*, 135*b* by using one or more suitable wireless communication protocols (e.g., GSM, CDMA, LTE, one or more IEEE 802.11 Standards such as Wi-Fi, WiMAX, BLUETOOTH, etc.). In some configurations, the on-board computer 110 may communicate with a particular vehicle 115*a*-115*n* directly in a peer-to-peer (P2P) manner via one or more of the communication components 135*a*, 135*b* and the direct wireless communication link 140, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more environmental communication components or devices, examples of which are depicted in FIG. 1A by references 142*a*, 142*b*, 142*c*, that are used for monitoring the status of one or more infrastructure components 145 and/or for receiving data generated by other sensors 150 that are associated with the vehicle 108 and disposed at locations that are off-board the vehicle 108. As generally referred to herein, with respect to the vehicle 108, "off-board sensors" or "environmental sensors" 150 are sensors that are not being transported by the vehicle 108. The data collected by the off-board sensors 150 is generally referred to herein as "sensor data," "off-board sensor data," or "environmental sensor data" with respect to the vehicle 108.

At least some of the off-board sensors 150 may be disposed on or at the one or more infrastructure components 145 or other types of components that are fixedly disposed within the environment in which the vehicle 108 is traveling. Infrastructure components 145 may include roadways, bridges, traffic signals, gates, switches, crossings, parking lots or garages, toll booths, docks, hangars, or other similar physical portions of a transportation system's infrastructure, for example. Other types of infrastructure components 145 at which off-board sensors 150 may be disposed may include a traffic light, a street sign, a railroad crossing signal, a construction notification sign, a roadside display configured to display messages, a billboard display, a parking garage monitoring device, etc. Off-board sensors 150 that are disposed on or near infrastructure components 145 may generate data relating to the presence and location of obstacles or of the infrastructure component 145 itself, weather conditions, traffic conditions, operating status of the infrastructure component 145, and/or behaviors of various vehicles 108, 115*a*-115*n*, pedestrians, and/or other moving objects within the vicinity of the infrastructure component 145, for example.

Additionally or alternatively, at least some of the off-board sensors 150 that are communicatively connected to the one or more infrastructure devices 145 may be disposed on or at one or more other vehicles 115*a*-115*n* operating in the vicinity of the vehicle 108. As such, a particular sensor that is disposed on-board another vehicle 115*a* may be viewed as an off-board sensor 150 with respect to the vehicle 108.

At any rate, the one or more environmental communication devices 142*a*-142*c* that are associated with the vehicle 108 may be communicatively connected (either directly or indirectly) to one or more off-board sensors 150, and thereby may receive information relating to the condition and/or location of the infrastructure components 145, of the environment surrounding the infrastructure components 145, and/or of other vehicles 115*a*-115*n* or objects within the environment of the vehicle 108. In some embodiments, the one or more environmental communication devices 142*a*-142*c* may receive information from the vehicle 108, while, in other embodiments, the environmental communication device(s) 142*a*-142*c* may only transmit information to the vehicle 108. As previously discussed, at least some of the environmental communication devices may be locally disposed in the environment in which the vehicle 108 is operating, e.g., as denoted by references 142*a*, 142*b*. In some embodiments, at least some of the environmental communication devices may be remotely disposed, e.g., at the back-end 104 of the system 100 as denoted by reference 142*c*. In some embodiments, at least a portion of the environmental communication devices may be included in (e.g., integral with) one or more off-board sensors 150, e.g., as denoted by reference 142*b*. In some configurations, at least some of the environmental communication devices 142 may be included or integrated into the one or more on-board communication components 135*a*, 135*b*, the on-board computer 110, and/or the mobile device 112 of surrounding vehicles 115a-115n (not shown).

In addition to receiving information from the on-board sensors 118 and off-board sensors 150 associated with the vehicle 108, the on-board computer 110 at the vehicle 108 may directly or indirectly control the operation of the vehicle 108 according to various fully- or semi-autonomous operation features. The autonomous operation features may include software applications or modules implemented by the on-board computer 110 to generate and implement control commands to control the steering, braking, or motive power of the vehicle 108. To facilitate such control, the on-board computer 110 may be communicatively connected to control components of the vehicle 108 by various electrical or electromechanical control components (not shown). When a control command is generated by the on-board computer 110, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

Further, the on-board computer 110 may control one or more operations of the vehicle 108 when the vehicle is operating non-autonomously. For example, the on-board computer 110 may automatically detect respective triggering conditions and automatically activate corresponding features such as traction control, windshield wipers, headlights, braking, etc.

FIG. 1B depicts a more detailed block diagram of the example back-end components 104 of the system 100. As shown in FIG. 1B, the remote computing system 130 included in the back-end components 104 may have a controller 151 that is operatively connected to the data storage device 132 via a link 152, which may be include a local and/or a remote link. It should be noted that, while not shown, additional data storage devices or entities may be linked to the controller 151 in a known manner. For example, separate, additional databases and/or data storage devices (not shown) may be used for various types of information, such as autonomous operation feature information, vehicle accidents, road conditions, vehicle insurance policy information, driver performance, or vehicle use information. Additional databases or data storage devices (not shown) may be communicatively connected to the remote computing system 130 via the network 120, such as databases maintained by third parties (e.g., weather databases, road construction databases, traffic congestion databases, road network databases, IoT (Internet-of-Things) or sensor databases implemented by a city or other jurisdiction, etc.).

The controller 151 may include one or more memories 160 (e.g., one or more program memories 160), one or more processors 162 (which may be called a microcontroller or a microprocessor), one or more random-access memories (RAMs) 164, and an input/output (I/O) circuit 166, all of which may be interconnected via an address/data bus 165. It should be appreciated that although only one microprocessor 162 is shown, the controller 151 may include multiple microprocessors 162. Similarly, the memory of the controller 151 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, optically readable memories, or biologically readable memories, for example. Generally speaking, the RAM 164 and/or the program memories 160 may respectively include one or more non-transitory, computer-readable storage media. The controller 151 may also be operatively connected to the network 120 via a link 170.

The remote computing system 130 may further include a number of applications 155a-155h stored in a program memory 160. In an embodiment, the applications 155a-155h comprise one or more software applications or sets of computer-executable instructions that are stored on the program memory 160 and executable by the processor 162. In an embodiment, at least some of the applications 155a-155h may be implemented at least partially in firmware and/or in hardware at the remote computing system 130.

The various applications 155a-155h on the remote computing system 130 may include, for example, a vehicle monitoring application 155a for receiving sensor data, whether from on-board sensors 118 and/or from off-board sensors 150, that is indicative of the operating behavior of the vehicle 108 and/or of its driver. The remote computing system 130 may also include an environmental monitoring application 155b for receiving data, whether from on-board sensors 118, off-board sensors 150, and/or third-party data feeds (not illustrated in FIG. 1A), that is indicative of environmental and contextual conditions in which the vehicle 108 is operating. Additionally, the remote computing system 130 may include an analytics application 155c for performing analytics, such as predictive and prescriptive analytics operations on datasets, a feedback application 155d for generating and providing feedback for a driver based on operating data, a driver safety performance evaluation application 155e for determining a performance of the driver of the vehicle 108, and a communication application 155f for communicating information and/or instructions to the vehicle 108 (e.g., to the on-board computing device 110, the mobile device 112, and/or another computing device disposed at the vehicle 108), to other vehicles 115a-115n, and/or to other computing systems. Other applications at the remote computing system 130 may include, for example, an application for supporting autonomous and/or semi-autonomous vehicle operations 155g and/or one or more other applications 155h which may support vehicle operations (whether fully-, semi- or non-autonomous) and other functions. Generally speaking, the applications 155a-155h may perform one or more functions related to identifying anomalous driving behavior for a vehicle based on past driving behavior. For example, one or more of the applications 155a-155h may perform at least a portion of any of the methods described herein.

The various modules or software applications 155a-155h may be executed on the same computer processor 162 or on different computer processors. Further, while the various applications 155a-155h are depicted as separate applications, two or more of the applications 155a-155h may be integrated as an integral application, if desired. In some embodiments, at least one of the applications 155a-155h may be implemented in conjunction with another application (not shown) that is stored and executed at the remote computing system 130, such as a navigation application.

The data storage device 132 is particularly configured to store various types of data related to and used for identifying anomalous driving behavior for a vehicle based on past driving behavior. The machine learning operations may be performed on any of the various types of data stored in the data storage device 132. For example, driver route data 175 may be stored at the data storage device 132. Driver route data 175 may include data that is indicative of the behavior of a driver and/or the behavior of the vehicle 108 while the vehicle 108 is being operated over a particular route, e.g., data that is sensed by on-board sensors 118 and/or by off-board sensors 150. Additionally, driver route data 175 may include data that is indicative of contextual or environmental conditions occurring while the vehicle 108 is being operated over the particular route, e.g., data that is provided by onboard sensors 118, off-board sensors 150, and/or third-party data feeds. Generally, each data point included in the driver route data 175 is time-stamped and includes an indication of a respective geo-location at which the data point was collected. That is, at least a portion of the driver route data 175 may include time-series data.

The data storage device 132 may also include historical driver data 178. Historical driver data 178 may include data that is indicative of driving behavior, vehicle operations, and environmental contexts in which multiple vehicles have traveled, e.g., along multiple routes and over multiple periods of time. For example, the historical driver data 178 may include respective driver route data 175 for a plurality of drivers of a plurality of vehicles over a plurality of routes and over a plurality of different periods of time. Each data point included in the historical driver data 178 may be associated with a respective timestamp an indication of a respective geo-location associated therewith, which may be indicative of the time in geo-location at which the data point was collected or obtained. That is, at least a portion of the historical driver data 178 may include time-series data. Additionally, analysis of this historical driver data 178 may indicate irregular occurrences of particular driving events that may be thought of as an irregular frequency for those driving events. Accordingly, an irregular frequency may be indicative of anomalous conditions and anomalous driving behavior.

In some embodiments, the data storage device 132 may include filtered data 180, which generally is a subset of the historical driver data 178. The historical driver data 178 may be filtered based on one or more conditions or parameters to generate the filtered data 180. For example, the filtered data 180 may be generated by filtering the historical driver data 178 based on a particular route, a time of day of travel, a particular weather condition, an amount of traffic congestion, whether the corresponding vehicle is an automobile or a truck, etc. Additionally or alternatively, the data storage device 132 may store a set of weights 182, which may correspond to various driving conditions and/or parameters. In an embodiment, the set of weights 182 may be included in a safe driver model 185, which may also be stored at the data storage device 182. One or more statistical analyses and/or learning techniques may be applied to the filtered data 180 to generate or create a safe driver model 185, which may be, for example, a statistical model. The safe driver model 185 may indicate or define the various weights or weightings 182 of various parameters included in the filtered historical driver data 180. The safe driver model 185 may be indicative of a level of safety (e.g., a safety score) of the driver while he or she was operating the vehicle 108 over a particular route during a particular time interval.

Additionally, it is noted that although the system 100 for identifying anomalous driving behavior for a vehicle based on past driving behavior is shown in FIGS. 1A and 1B to include one vehicle 108, one mobile device 112, one on-board computer 110, and one remote computing system 130, it should be understood that different numbers of vehicles 108, mobile devices 112, on-board computers 110, and/or remote computing devices or servers 130 may be utilized. For example, the system 100 may include a plurality of servers 130 and hundreds or thousands of mobile devices 112 or on-board computers 110, all of which may be interconnected via the network 120. Furthermore, the database storage or processing performed by the one or more servers 130 may be distributed among a plurality of servers 130 in an arrangement known as "cloud computing." This configuration may provide various advantages, such as enabling near real-time uploads and downloads of information as well as periodic uploads and downloads of information. This may in turn support a thin-client embodiment of the mobile device 112 or on-board computer 110 discussed herein. Further, in some embodiments, any number of other vehicles 115a-115n may be communicatively connected to and/or included in the system 100, e.g., via the network 120.

Figure 2:
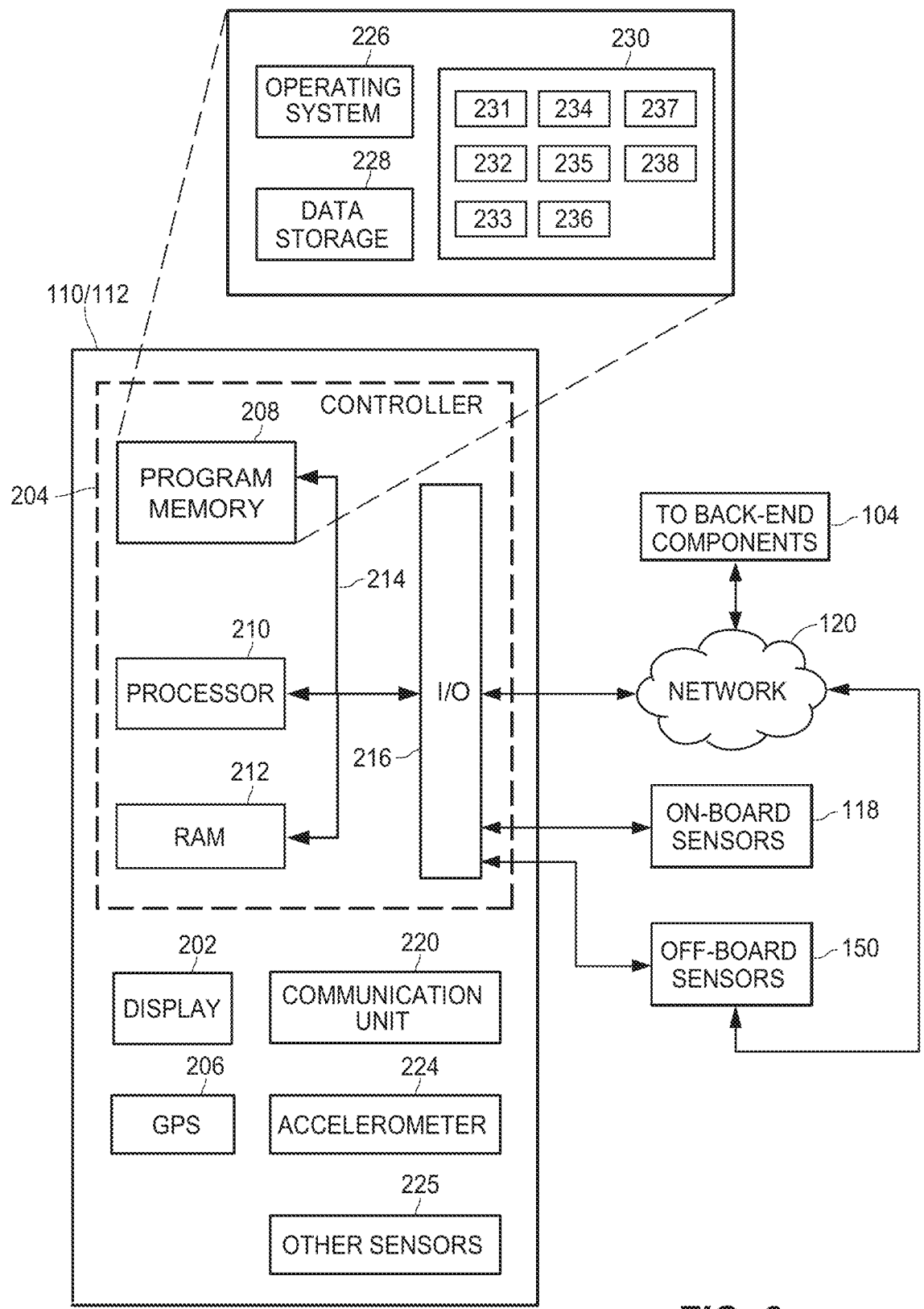
FIG. 2 illustrates a block diagram of an exemplary mobile device or on-board computer that may operate in conjunction with the system of FIGS. 1A and 1B.

FIG. 2 illustrates a block diagram of an exemplary mobile device 112 or an exemplary on-board computer 110 consistent with the system 100. The mobile device 112 or on-board computer 110 may include a display 202, a GPS or other suitable geo-location unit 206, a communication unit 220, an accelerometer 224, one or more additional sensors 225, a user-input device (not shown), and/or a controller 204, similar to the controller 151 in the remote computing system 130. In some embodiments, the mobile device 112 and on-board computer 110 may be integrated into a single device, or either may perform the functions of both. The on-board computer 110/mobile device 112 may interface with one or more on-board sensors 118 that are disposed at the vehicle 108 (but that are separate from the device 110/112) to receive information regarding the vehicle 108 and its environment. Additionally, the on-board computer 110/mobile device 112 may interface with one or more off-board sensors 150 to receive information regarding the vehicle 108 and its environment.

Similar to the controller 151, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, and/or a plurality of software applications 230. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for the on-board computer 110. The data storage 228 may include data such as user profiles and preferences, application data for the plurality of applications 230, and other data related to evaluating driver performance. In some embodiments, the controller 204 may also include, or otherwise be communicatively connected to, other data storage mechanisms (e.g., one or more hard disk drives, optical storage drives, solid state storage devices, etc.) that reside within the vehicle 108 and/or at the remote system 130.

As discussed with reference to the controller 151, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

Generally speaking, the RAMs 212 and/or the program memories 208 may respectively include one or more non-transitory, computer-readable storage media.

The one or more processors 210 of the device 110/112 may be adapted and configured to execute any of one or more of the plurality of software applications 230 residing in the program memory 204, in addition to other software applications. The various software applications 230 of the device 110/112 may include, for example, a vehicle monitoring application 231 for receiving (whether from on-board sensors 118 and/or from off-board sensors 150) sensor data indicative of the operating behavior of the vehicle 108 and/or of the driver, an environmental monitoring application 232 for receiving (whether from on-board sensors 118, off-board sensors 150, and/or third-party data feeds) data indicative of environmental and contextual conditions in which the vehicle 108 is operating, an analytics application 233 for performing analytics, such as predictive and prescriptive analytics operations on datasets, a feedback application 234 for generating and providing feedback for a driver based on operating data, a driver safety performance evaluation application 235 for determining a performance of the driver of the vehicle 108, and a communication application 236 for communicating information and/or instructions to the vehicle 108 (e.g., to another computing device or system disposed at the vehicle 108), to other vehicles 115a-115n, to the remote computing system 130, to other back-end components 104 of the system 100 such as the environmental communication device 142c, and/or to other computing systems. Other applications that are executed at the device 110/112 may include, for example, an application for supporting autonomous and/or semi-autonomous vehicle operations 237 and/or one or more other applications 238 which may support vehicle operations (whether fully-, semi-, or non-autonomous). Generally speaking, the applications 230 may perform one or more functions related to evaluating driver safety performance, providing feedback, performing machine learning operations, and identifying anomalous driving behavior. For example, one or more of the applications 230 may perform at least a portion of any of the methods described herein. In some embodiments, one or more of the applications 230 may operate in conjunction with one or more of the applications 155a-155h at the remote computing system 130 to perform one or more functions related to identifying anomalous driving behavior. For example, one or more of the applications 231-238 at the device 110/112 may be implemented as a thin-client that operates in conjunction with one or more of the applications 231-238 at the remote computing system.

The various software applications 230 may be executed on the same computer processor 210 or on different computer processors. Further, while the various applications 231-238 are depicted as separate applications, two or more of the applications 231-238 may be integrated as an integral application, if desired. In some embodiments, at least one of the applications 231-238 may be implemented in conjunction with another application (not shown) that is stored and executed at the device 110/112, e.g., a navigation application, a user interface application, etc.

In addition to the communicative connections to the on-board sensors 118 that are disposed at the vehicle 108 but not at, on, or within the device 110/112 itself, the device 110/112 may include additional on-board sensors 118 that are integral with the device 110/112, such as the GPS unit 206 and/or the accelerometer 224, which may provide information regarding the operation of the vehicle 108. Such integral sensors 118 may further include one or more sensors of a sensor array 225, which may include, for example, one or more cameras, additional accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, direction, and/or other parameters associated with movements of the vehicle 108.

Furthermore, the communication unit 220 of the device 110/112 may communicate with other vehicles 115a-115n, infrastructure or environmental components 142, 145, back-end components 104, or other external sources of information to transmit and receive information relating to providing vehicle driver feedback based on analytics. For example, the communication unit 220 may be included in or may include one or more of the communication components 135a, 135b shown in FIG. 1A. Additionally or alternatively, the communication unit 220 may be included in or may include an instance of the environmental communication component 142 shown in FIG. 1A. The communication unit 220 may communicate with the external sources via the network 120 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Further, the communication unit 220 may provide input signals to the controller 204 via the I/O circuit 216. The communication unit 220 may also transmit sensor data, device status information, control signals, or other output from the controller 204 to one or more sensors 118 within the vehicle 108, mobile devices 112, on-board computers 110, off-board sensors 150, environmental communication devices 142, and/or remote servers 130.

Further, the mobile device 112 or the on-board computer 110 may include a user-input device (not shown) for receiving instructions or information from the vehicle operator, such as settings, selections, acknowledgements, etc. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Figure 3:
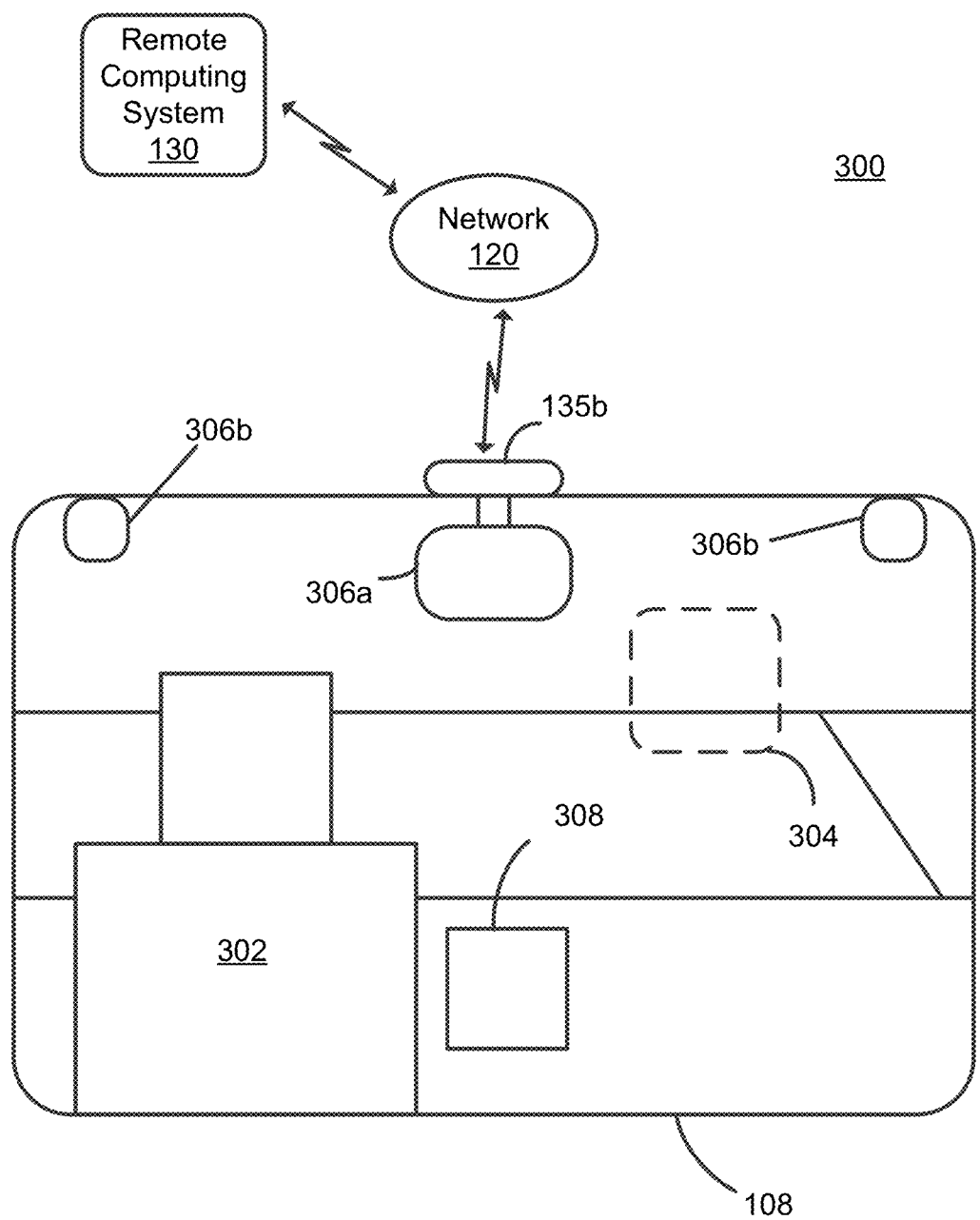
FIG. 3 depicts a vehicle utilizing a system for identifying anomalous driving behavior for a vehicle based on past driving behavior.

FIG. 3 depicts a vehicle utilizing a system 300 for identifying anomalous driving behavior for a vehicle based on past driving behavior. FIG. 3 includes a vehicle 108, a vehicle driver 302, a device 308 (which may be the onboard computer 110, or the mobile device 112 of FIG. 1A, FIG. 2), a network 120, a remote computing system 130, a communication component 135b, a driving event 304, and a set of sensors/feedback providers 306a . . . 306b. In some embodiments, the system 300, or more particularly the device 308, may make use of an anomaly detection engine, such as the anomaly detection engine described below in reference to FIGS. 5A-6. In other embodiments, the anomaly detection engine is a part of the device 308. In some embodiments, the system 300 may have less components or more components than shown in FIG. 3. For example, in some embodiments, the device 308 is an onboard computer 110 included in the vehicle 108. In other embodiments, the device 308 is the mobile device 112 included in the vehicle 108.

The feedback/alert system may provide feedback/alerts through the feedback device 308 and the sensors/feedback providers 306a . . . 306b, or any combinations thereof. The sensors/feedback providers 306a . . . 306b may, in some embodiments, track the environmental conditions inside the vehicle cabin as well as the activities of the vehicle driver 302. Additionally, any data that is utilized by the feedback system 300 may originate from the vehicle 108, the vehicle driver 302, the onboard computer 110, the mobile device 112, the remote computing system 130, the set of sensors/ feedback providers 306a . . . 306b, or combinations thereof. The system 300, and the device 308, may work in conjunction with the systems and components described above in FIGS. 1A, 1B, and 2. For example, the feedback device 308 may rely upon applications stored within the remote computing system 130, as well as any or all applications stored within the onboard computer 110 and/or the mobile device 112, to perform operations necessary for providing feedback or handling other operations.

An example operation of the system 300 may include the driver 302 driving their vehicle on a trip. Along the trip, the vehicle 108 reports out data about the vehicle 108 status. This may be the MTC data, or BSM data, discussed above. This data may be collected, by the device 308, or another system via the network 120, such as a the remote computing system 130. This data is collected as time-series data. The time-series data may need to be manipulated to be put into a more usable form. In one embodiment, a Fourier transform may be performed on this time-series data to put the time-series data into a different format. Machine learning operations may be performed on this transformed data. The machine learning operations may utilize the following: random forests to help identify anomalous conditions in the data; an isolation forest to help identify anomalous conditions in the data; and/or another type of machine learning operation. After identifying the anomalous conditions a dataset may be generated with the findings. This dataset may be compared to historical data for the vehicle 108 and driver 302. Thresholds may be used to determine whether the collected data is indicative of anomalous driving behaviors. These thresholds may be predetermined by the driver 302, by an insurance company that the driver 302 uses to insure the vehicle 108, or by analyzing multiple driver datasets to determine what are safe thresholds.

In embodiments where an isolation forest is used, the isolation forest may be generated by creating random decision trees from the time-series data, and calculating a path to each data point along the tree. These paths, and the differences between them, and along them, may be used to identify the separation or difference between data points and thus whether a data point is an isolated data point and therefore anomalous. The machine learning operations may be run many times to train a model to be used for identifying anomalous driving behavior. This training may consist of feeding many historical driving datasets into the system 300 and refining what is or is not considered anomalous based on each prior iteration. This type of training may be thought of as post-processing training. Conversely, the machine learning operations may be run while the vehicle operates and as such the device 308/vehicle 108 may "learn" what is anomalous driving behavior for the driver 302 as the driver 302 is driving.

In one embodiment, the device 308 receives a set of time-series driving data for the vehicle, wherein the set of time-series driving data is indicative of a set of operating conditions for the vehicle. This time-series data may be received via any of the communication devices listed above and may be received periodically. In some embodiments, the set of time-series driving data may be basic safety message data transmitted periodically by the vehicle. In some embodiments, the basic safety message data includes a message id, a conditions dataset, a safety data set, and a status dataset. Similarly, in some embodiments, the operating conditions include time data, coordinate data, movement data, acceleration data, brake system data, and vehicle attribute data.

The device 308 may perform machine learning operations on the set of time-series driving data. In some embodiments, the device 308 performing machine learning operations further includes generating an isolation forest using the time-series driving data. Generating the isolation forest may be similar to the process for generating an isolation forest described above.

The device 308 may identify a set of anomalous conditions in the time-series driving data based on a result set produced by the machine learning operations, wherein the set of anomalous conditions are indicative of an anomalous vehicle behavior. In other embodiments, the device identifies the set of anomalous conditions in the time-series driving data by identifying unusual frequencies for the time-series driving data.

The device 308 may compare the set of anomalous conditions to a set of historical time-series driving data for the vehicle. The device 308 may generate a vehicle feedback based on the time-series driving data and the comparison of the set of anomalous conditions to the set of historical time-series driving data. The feedback may be to the driver 302, to the vehicle 108, or to other vehicles nearby.

The system 300 may in some embodiments detect anomalous vehicle behavior that includes data indicative of a medical situation, a distracted driver, unidentified road conditions, or combinations thereof. Similarly, in some embodiments comparing the set of anomalous conditions to a set of historical time-series driving data for the vehicle further includes comparing, at the one or more processors, the set of anomalous conditions to a set of threshold values. In some cases the anomalous conditions and even the anomalous vehicle behavior may be caused by the driving event 304 on the road.

The system 300, and in particular the device 308, may be crucial to alerting the driver 302 of potentially dangerous situations. This may be done through the feedback devices 306a and 306b. Similarly, the device 308 may communicate to other vehicles on the road any potentially dangerous situations occurring with the driver 302. The feedback may also be useful to the vehicle 108 itself. For example, if the vehicle 108 is an autonomous vehicle, or semi-autonomous vehicle, then the feedback (e.g. the driver 302 is having a cardiac arrest) may be instructions to safely park the vehicle 108 and call for emergency services, or to avoid any dangerous situations on the road while navigating to a hospital.

Figure 4:
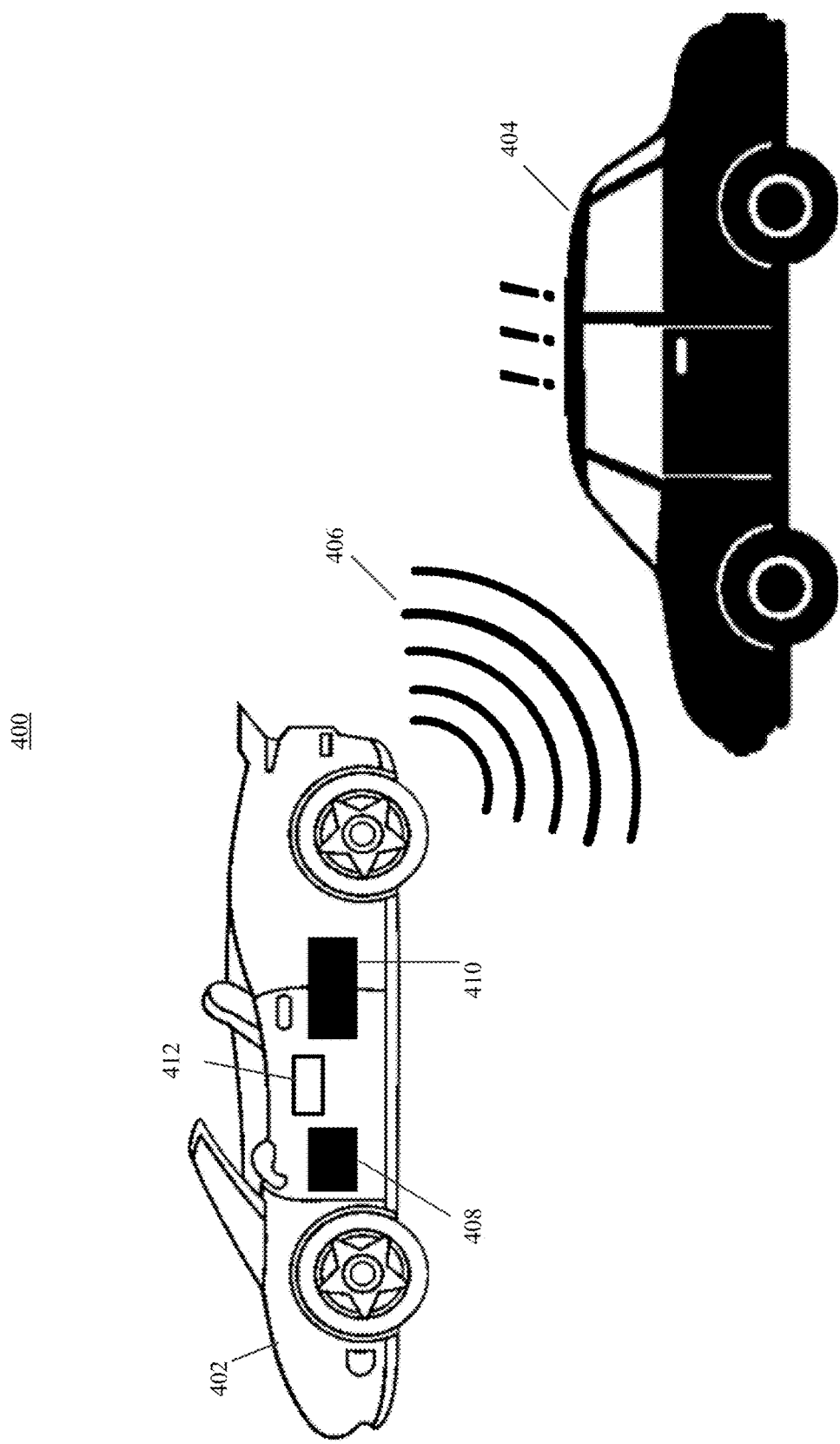
FIG. 4 depicts two vehicles utilizing the system for identifying anomalous driving behavior based on past driving behavior.

FIG. 4 depicts two vehicles utilizing the system for identifying anomalous driving behavior based on past driving behavior. The environment 400 shown includes a vehicle 402, another vehicle 404, a vehicle to vehicle (V2V) communication between the vehicles 406, a vehicle awareness device (VAD) 408, an anomaly detection engine 410, and a basic safety message 412 (BSM). The anomaly detection engine 410 may be implemented as part of the system described in FIG. 3, and/or as a standalone system utilizing components depicted in FIG. 15. In an example embodiment, the VAD 408 monitors the conditions of the vehicle 402 and transmits BSMs to the anomaly detection engine 410. In the event that an anomalous driving behavior is detected by the anomaly detection engine 410, V2V message is transmitted from vehicle 402 to vehicle 404 communicating the potential danger.

FIGS. 5A-5F depict an example embodiment of how anomalous driving behaviors may be detected by the systems and methods disclosed herein. In particular, example embodiments of how an anomaly detection engine, such as the anomaly detection engine depicted in FIG. 4, may work are shown. The functionality depicted in FIGS. 5A-5F may be used as part of real-time detection of anomalous driving behavior, as well as used as part of post-processing detection of anomalous driving behavior.

Figure 5A:
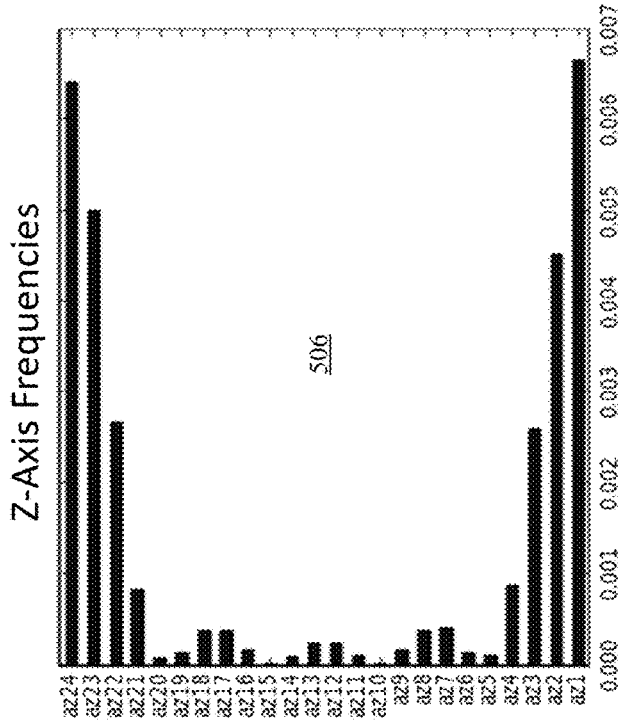
FIG. 5A depicts a vehicle utilizing the system for identifying anomalous driving behavior based on past driving behavior.
Figure 5A:
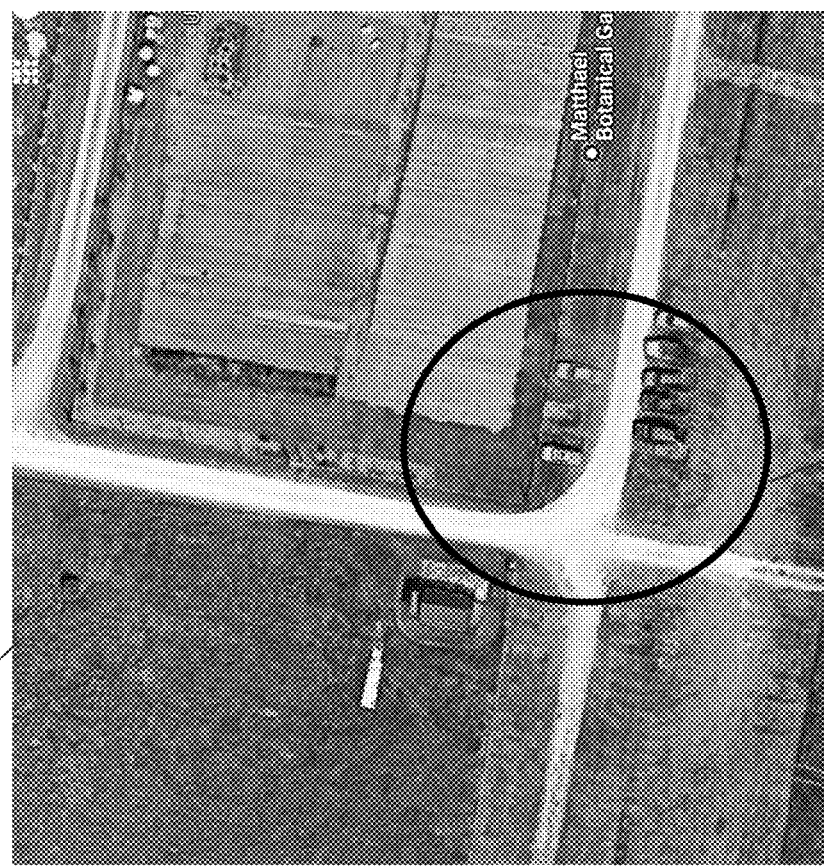

FIG. 5A depicts a vehicle utilizing the system for identifying anomalous driving behavior based on past driving behavior. FIG. 5A includes a map of a vehicle 502, a vehicle 504 shown inside of a circle, and a chart of z axis frequencies 506. In an example embodiment, measurements of the x, y, and z axis movement of the vehicle 504 are taken and transmitted to an anomaly detection engine. The measurements indicate no movement of the vehicle 504 along the x or y axis. Instead, the vehicle 504 is shown as stationary with frequent vertical movement over an eight minute period of time. The chart 506 shows the movement along the z access of the vehicle 504.

Figure 5B:
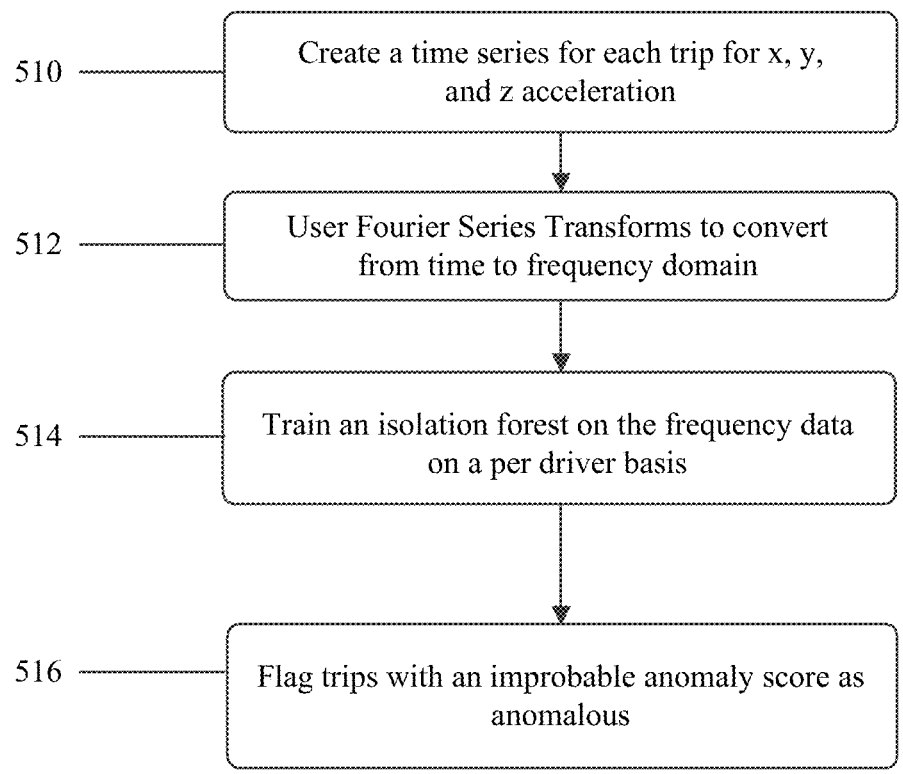
FIG. 5B depicts an example method for identifying anomalous driving behavior based on past driving behavior.

FIG. 5B depicts an example method for identifying anomalous driving behavior based on past driving behavior. The steps of the method 508 may be performed by systems coupled to a vehicle such as the remote computing system 130, the anomaly detection engine 410, and/or on-board computer 110/mobile device 112 described in FIGS. 1A-4. The method 508 may include additional, fewer, or alternative actions, including those described elsewhere herein. The method 508 includes creating a time series for each trip for x, y, and z acceleration (block 510); using a Fourier series transform to convert the time series to a frequency domain (block 512); training an isolation forest on the frequency data, based on the time series data, on a per driver basis (block 514); and flagging trips with an improbable anomaly score as anomalous (block 516).

Figure 5C:
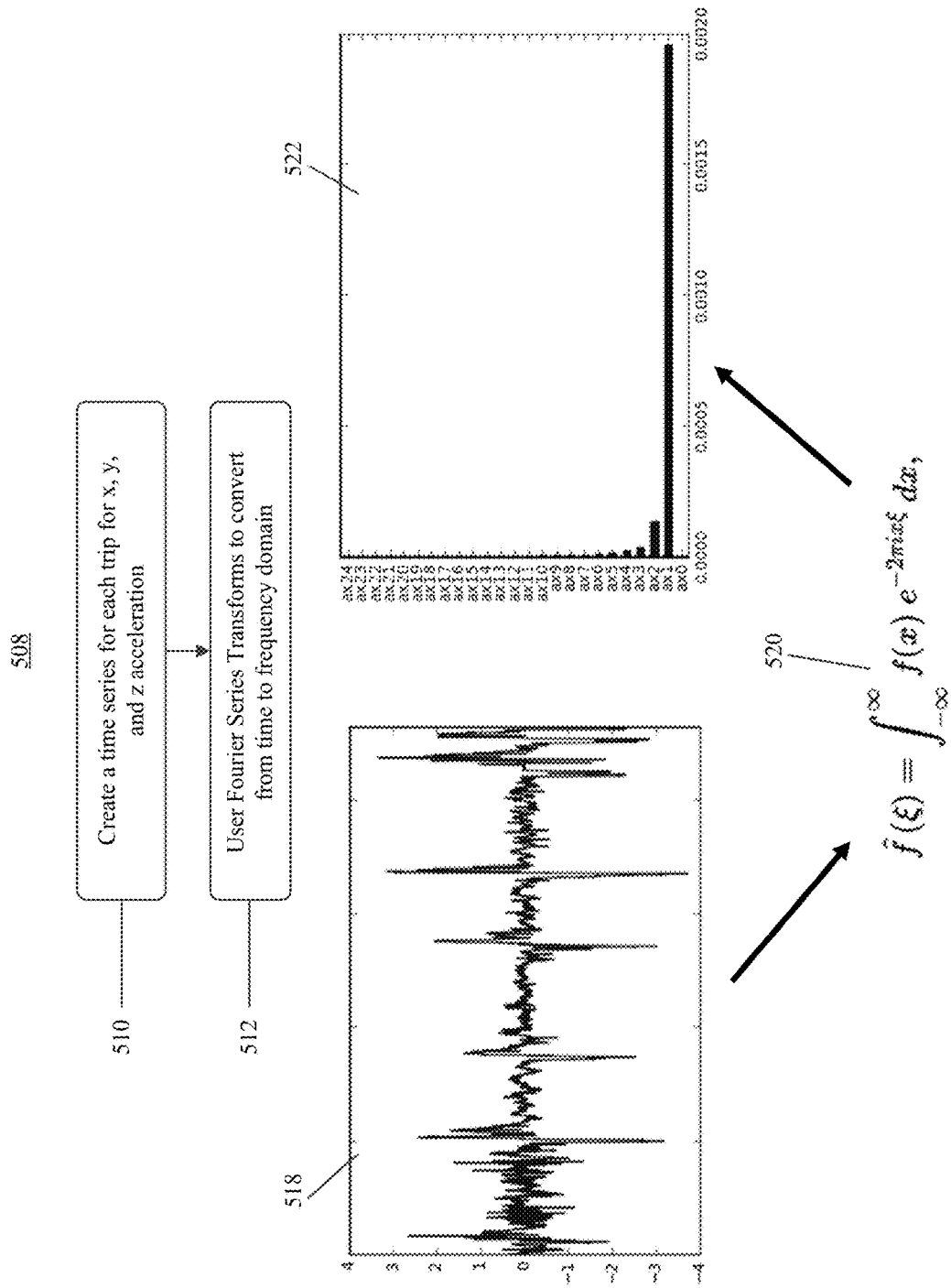
FIG. 5C depicts example steps for transforming time series data to frequency data.

FIG. 5C depicts example steps, such as blocks 510 and 512 of method 508, for transforming time series data to frequency data. Two charts 518 and 522 are shown, where the chart 518 displays time series data, and the chart 522 displays frequency data. The formula 520 may be used to convert the time series data depicted in chart 518 to the frequency data depicted in chart 522. In particular, the formula 520 may convert continuous time series data into discrete frequency data. The time series data depicted in chart 518 may be data collected by the systems and methods herein that may be indicative of anomalous driving behavior. This data may be any of the data types listed herein, such as the MTC data and data collected as part of BSMs.

Figure 5D:
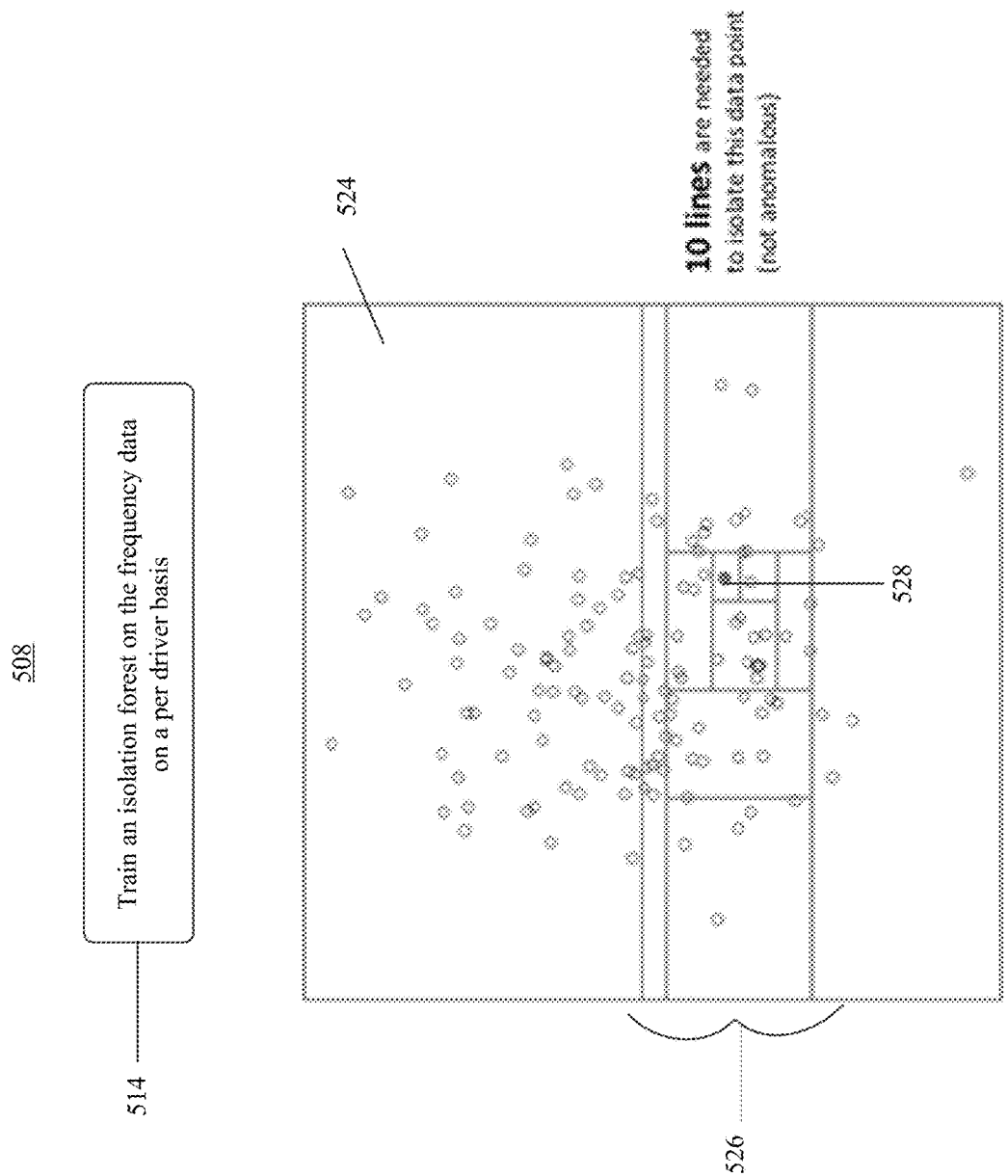
FIG. 5D depicts a plot of frequency data converted from time series data that may be indicative of anomalous driving behavior.

FIG. 5D depicts a plot of frequency data converted from time series data that may be indicative of anomalous driving behavior. FIG. 5D may be part of training an isolation forest on the frequency data on a per driver basis (block 514) as depicted in method 508. A forest of frequency data points 524 is shown, as well as lines 526 isolating sets of data points within the forest of frequency data points, and a target data point 528 to be isolated. The lines may be decision boundaries used to isolate data points from each other. In an example embodiment, an anomaly detection engine may isolate an ever increasingly small number of frequency data points by drawing a line dividing the data points into smaller and smaller quadrants. Eventually, only one data point, in this case 528, may be left. As shown in the figure ten lines are needed to isolate the data point 528. Similarly, FIG. 5E depicts a plot of frequency data converted from time series data that may be indicative of anomalous driving behavior. Here an anomaly detection engine may only need four lines to isolate a data point, in this case data point 530, to determine that data point is anomalous.

Figure 5F:
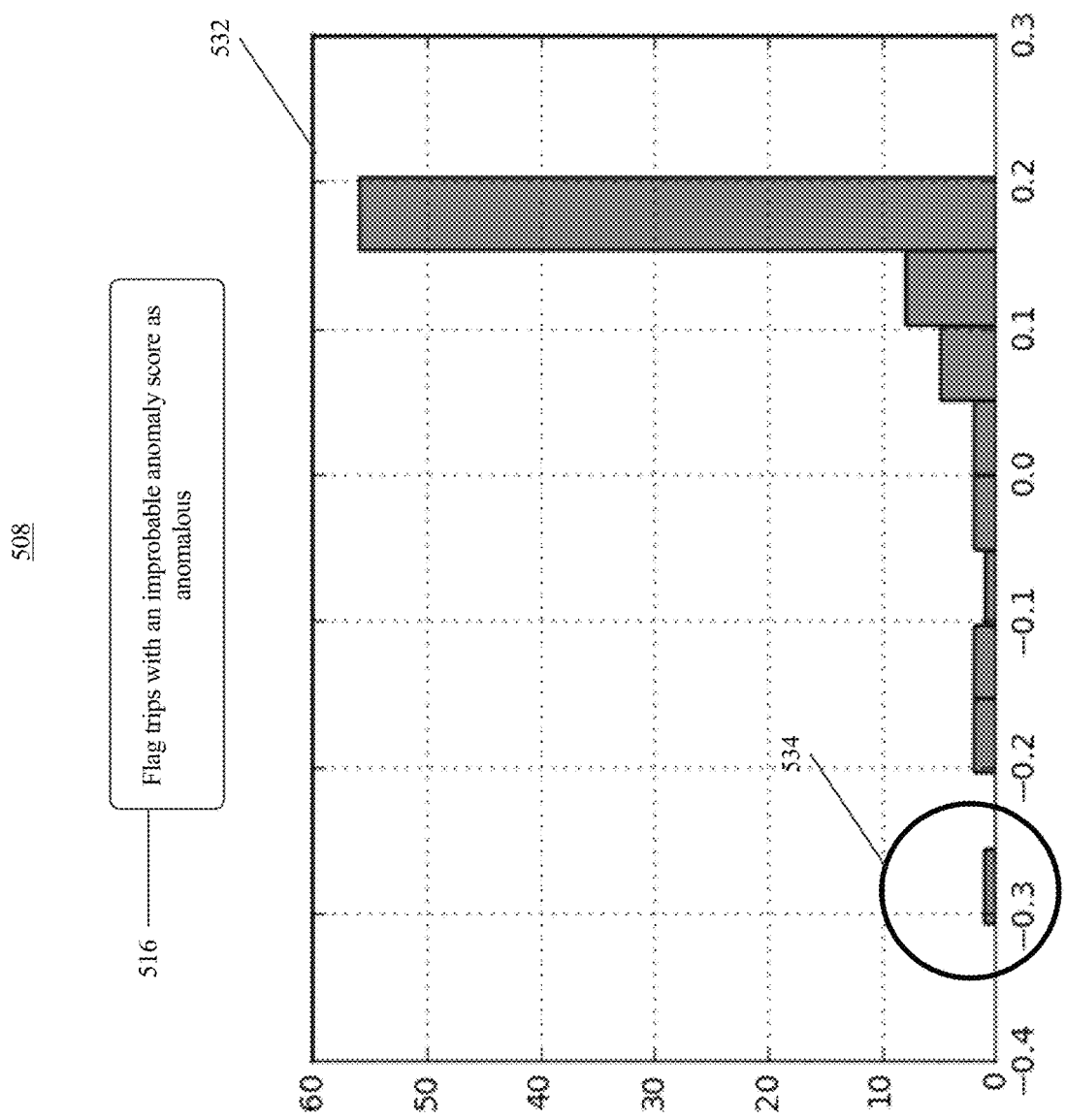
FIG. 5F depicts an example histogram showcasing vehicle trips anomaly scores.

FIG. 5F depicts an example histogram showcasing vehicle trips anomaly scores. The histogram may be constructed as part of flagging trips with an improbable anomaly score as anomalous (block 516) of method 508. The histogram 532 displays a series of trips taken by a vehicle. Each vehicle trip corresponding to a particular score adds to the total size of the bar in the histogram. These trips may be scored according to how anomalous they are in relation to each other, in relation to trips taken by the driver in the past, and/or in relation to trips taken by other drivers. The circle 534 highlights the anomalous trips that have been flagged by the systems and methods disclosed herein, and more particularly identified by an anomaly detection engine.

Figure 6:
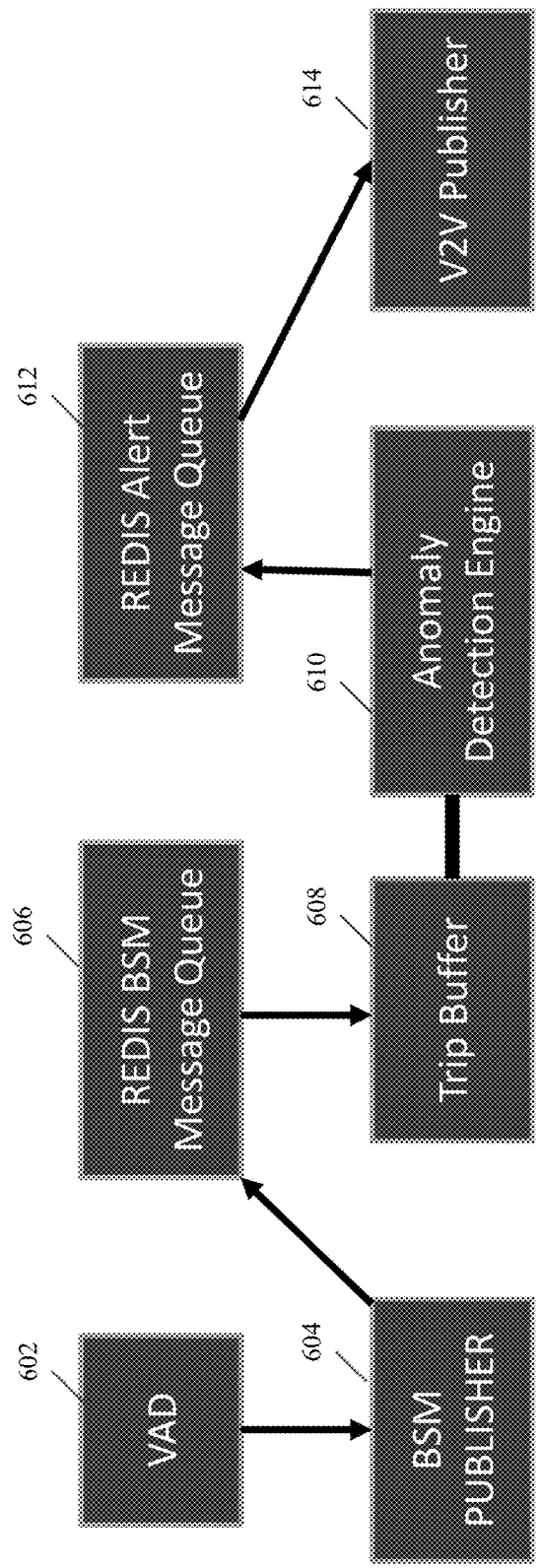
FIG. 6 depicts an example buffering system for use by the system for identifying anomalous driving behavior based on past driving behavior.

FIG. 6 depicts an example buffering system for use by the system for identifying anomalous driving behavior based on past driving behavior. The example buffering system may make use of Redis, an in-memory data structure store, used as a database, cache and message broker. By using Redis as a key-value store of time series data collected on a vehicle, an efficient message broker architecture may be deployed that allows the system to consume messages as they are generated, by for example the VAD or ASD described, and buffered for anomaly detection. Because Redis uses an in-memory data structure storage implementation, data is stored in main memory either directly, or indirectly, connected to a CPU. This allows for much faster data access than data that is stored in disk storage.

For example, the process 600 depicted in FIG. 6 includes the use of a VAD 602, a BSM publisher 604, a Redis BSM message queue 606, a trip buffer 608, an anomaly detection engine 610, a Redis alert message queue 612, and a V2V publisher 614. In an example embodiment, the VAD 602 detects and monitors BSMs that are then published by the BSM publisher 604. The BSM publisher 604 may add these BSMs to the Redis BSM message queue 606 that are subsequently added to a trip buffer 608. These BSMs are communicated to, and analyze by, the anomaly detection engine 610. Based on the analysis performed by the anomaly detection engine 610, alert messages may be added to the Redis alert message queue 612. The Redis alert message queue 612 may transmit alerts to the V2V publisher 614, which subsequently transmits alerts and the corresponding data to other vehicles in communication with the vehicle that originates the BSMs.

Figure 7:
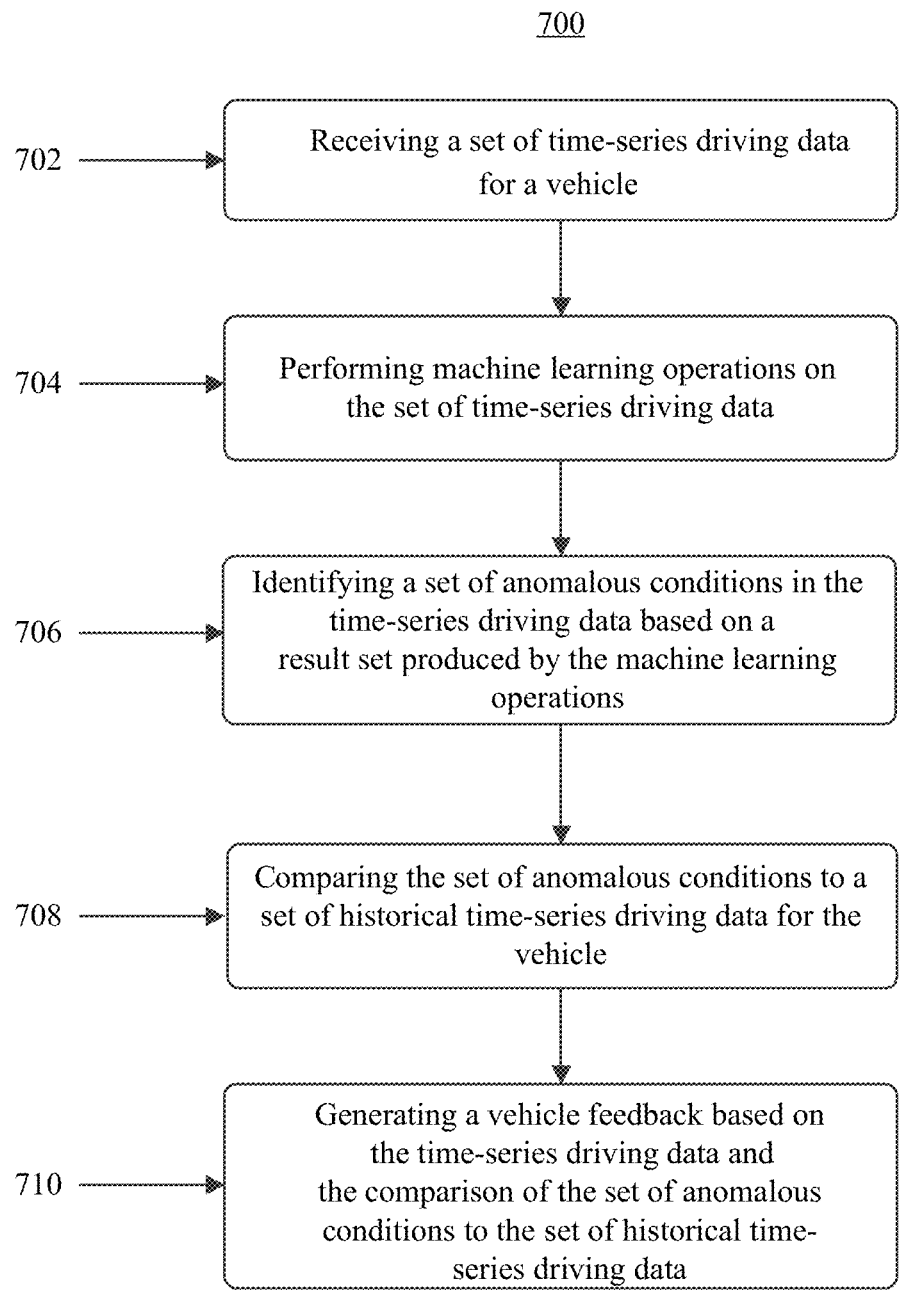
FIG. 7 depicts an exemplary flow diagram for identifying anomalous driving behavior for a vehicle based on past driving behavior.

FIG. 7 depicts an exemplary flow diagram for identifying anomalous driving behavior for a vehicle based on past driving behavior. The steps of the method 700 may be performed by systems coupled to a vehicle such as the remote computing system 130 and/or on-board computer 110/mobile device 112 described in FIGS. 1A-3. The method 700 may include additional, fewer, or alternative actions, including those described elsewhere herein.

The method 700 for identifying anomalous driving behavior for a vehicle based on past driving behavior includes receiving a set of time-series driving data for the vehicle, wherein the set of time-series driving data is indicative of a set of operating conditions for the vehicle (block 702); performing machine learning operations on the set of time-series driving data (block 704); identifying a set of anomalous conditions in the time-series driving data based on a result set produced by the machine learning operations, wherein the set of anomalous conditions are indicative of an anomalous vehicle behavior (block 706); comparing the set of anomalous conditions to a set of historical time-series driving data for the vehicle (block 708); and generating a vehicle feedback based on the time-series driving data and the comparison of the set of anomalous conditions to the set of historical time-series driving data (block 710).

In some embodiments, the set of time-series driving data may be basic safety message data transmitted periodically by the vehicle. In some embodiments, the basic safety message data includes a message id, a conditions dataset, a safety data set, and a status dataset. Similarly, in some embodiments, the operating conditions include time data, coordinate data, movement data, acceleration data, brake system data, and vehicle attribute data.

In some embodiments of the method, performing machine learning operations further includes generating an isolation forest using the time-series driving data. In other embodiments, the computer implemented method includes identifying the set of anomalous conditions in the time-series driving data includes identifying unusual frequencies for the time-series driving data.

In some embodiments, the anomalous vehicle behavior includes data indicative of a medical situation, a distracted driver, unidentified road conditions, or combinations thereof. Similarly, in some embodiments comparing the set of anomalous conditions to a set of historical time-series driving data for the vehicle further includes comparing, at the one or more processors, the set of anomalous conditions to a set of threshold values.

Figure 8:
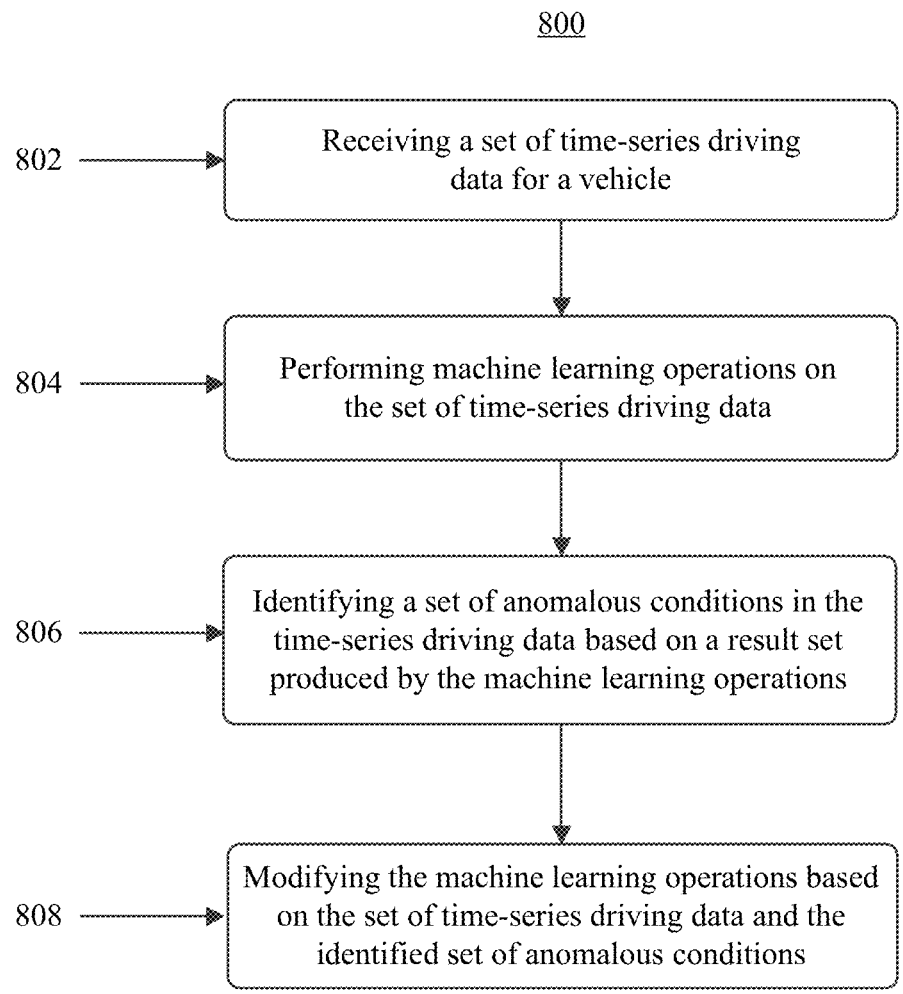
FIG. 8 depicts an exemplary flow diagram for identifying anomalous driving behavior for a vehicle based on past driving behavior.

FIG. 8 depicts an exemplary flow diagram for identifying in anomalous driving behavior for a vehicle based on past driving behavior. The steps of the method 800 may be performed by systems coupled to a vehicle such as the remote computing system 130 and/or on-board computer 110/mobile device 112 described in FIGS. 1A-3. The method 800 may include additional, fewer, or alternative actions, including those described elsewhere herein.

The method 800 for identifying anomalous driving behavior for a vehicle based on machine learning operations includes receiving a set of time-series driving data, wherein the set of time-series driving data is indicative of a set of operating conditions for the vehicle (block 802); performing machine learning operations on the set the set of time-series driving data (block 804); identifying a set of anomalous conditions in the time-series driving data based on a result set produced by the machine learning operations, wherein the set of anomalous conditions are indicative of an anomalous vehicle behavior (block 806); and modifying the machine learning operations based on the set of time-series driving data and the identified set of anomalous conditions (block 808).

In some embodiments, the set of time-series driving data may be basic safety message data transmitted periodically by the vehicle. In some embodiments, the basic safety message data includes a message id, a conditions dataset, a safety data set, and a status dataset. Similarly, in some embodiments, the operating conditions include time data, coordinate data, movement data, acceleration data, brake system data, and vehicle attribute data.

In some embodiments, performing machine learning operations further includes generating an isolation forest using the time-series driving data. In other embodiments, the computer implemented method identifying the set of anomalous conditions in the time-series driving data further includes identifying unusual frequencies for the time-series driving data.

In some embodiments, the anomalous vehicle behavior includes data indicative of a medical situation, a distracted driver, unidentified road conditions, or combinations thereof. In other embodiments, modifying the machine learning operations based on the set of time-series driving data and the identified set of anomalous conditions further includes comparing the set of anomalous conditions to a set of threshold values.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer implemented method for identifying anomalous driving behavior for a vehicle based on past driving behavior, the method comprising:

receiving, at one or more processors, a set of time-series driving data for the vehicle, wherein the set of time-series driving data includes at least one of: vehicle coordinate data, vehicle movement data, vehicle acceleration data, and vehicle brake system data;

converting, at the one or more processors, the set of time-series driving data for the vehicle into a set of frequency data for the vehicle;

performing, at the one or more processors, machine learning operations on the set of frequency data in order to identify irregular frequencies of particular driving events;

identifying, at the one or more processors, based on the irregular frequencies of the particular driving events, a set of anomalous conditions in the time-series driving data, wherein the set of anomalous conditions comprise data indicative of an anomalous vehicle behavior, wherein the data indicative of the anomalous vehicle behavior includes data indicative of a medical situation;

comparing, at the one or more processors, the set of anomalous conditions to a set of historical time-series driving data for the vehicle; and generating, at the one or more processors, a vehicle feedback based on the time-series driving data and the comparison of the set of anomalous conditions to the set of historical time-series driving data, wherein the vehicle feedback includes a vehicle feedback message to be provided to a driver operating the vehicle; and providing, by a communication system that is contained within the vehicle, the vehicle feedback message to the driver of the vehicle.

2. The computer implemented method of claim 1, wherein the set of time-series driving data is basic safety message (BSM) data transmitted periodically by the vehicle.

3. The computer implemented method of claim 2, wherein the basic safety message (BSM) data comprise a message identifier, a conditions dataset, a safety data set, and a status dataset.

4. The computer implemented method of claim 1, wherein performing machine learning operations further comprises:
generating, at the one or more processors, an isolation forest using the time-series driving data.

5. The computer implemented method of claim 1, wherein comparing the set of anomalous conditions to a set of historical time-series driving data for the vehicle further comprises:
comparing, at the one or more processors, the set of anomalous conditions to a set of threshold values.

6. A system for identifying anomalous driving behavior for a vehicle based on machine learning operations, the system comprising:

a network interface configured to interface with a processor;

a plurality of sensors affixed to the vehicle and configured to interface with the processor;

a memory configured to store non-transitory computer executable instructions and configured to interface with the processor; and the processor configured to interface with the memory, wherein the processor is configured to execute the non-transitory computer executable instructions to cause the processor to:

receive a set of time-series driving data, wherein the set of time-series driving data includes at least one of: vehicle coordinate data, vehicle movement data, vehicle acceleration data, and vehicle brake system data;

convert the set of time-series driving data for the vehicle into a set of frequency data for the vehicle;

perform machine learning operations on the set of frequency data in order to identify irregular frequencies of particular driving events;

identify, based on the irregular frequencies of the particular driving events, a set of anomalous conditions in the time-series driving data, wherein the set of anomalous conditions comprise data indicative of an anomalous vehicle behavior, wherein the data indicative of the anomalous vehicle behavior includes data indicative of a medical situation; and generate a vehicle feedback based on the set of time-series driving data and the identified set of anomalous conditions, wherein the vehicle feedback includes a vehicle feedback message to be provided to a driver operating the vehicle; and provide, by a communication system that is contained within the vehicle, the vehicle feedback message to the driver of the vehicle.

7. The system of claim 6, wherein perform machine learning operations further comprises:
generate an isolation forest using the time-series driving data.

8. The system of claim 6, wherein identify the set of anomalous conditions in the time-series driving data further comprises:
identify unusual frequencies for the time-series driving data.

9. The system of claim 6, wherein generate a vehicle feedback further comprises:
compare the set of anomalous conditions to a set of threshold values.

* * * * *